(12) United States Patent
Hombravella Abbad et al.

(10) Patent No.: US 7,137,403 B2
(45) Date of Patent: Nov. 21, 2006

(54) DEVICE FOR PRODUCING BYPASSES UNDER PRESSURE IN FLUID PIPING SYSTEMS

(76) Inventors: Marcelo Hombravella Abbad, Emancipacio, 26 4°2a, 8022 Barcelona (ES); Daniel Guillo Vive, Emancipacio, 26 4°2a, 8022 Barcelona (ES)

( * ) Notice: Subject to any disclaimer, the term of this patent is extended or adjusted under 35 U.S.C. 154(b) by 116 days.

(21) Appl. No.: 10/516,323

(22) PCT Filed: Jun. 11, 2003

(86) PCT No.: PCT/ES03/00282

§ 371 (c)(1),
(2), (4) Date: Dec. 13, 2004

(87) PCT Pub. No.: WO03/106880

PCT Pub. Date: Dec. 24, 2003

(65) Prior Publication Data

US 2005/0247344 A1    Nov. 10, 2005

(30) Foreign Application Priority Data

Jun. 12, 2002  (ES)  ................. 200201352
May 14, 2003  (ES)  ................. 200301116

(51) Int. Cl.
*F16L 41/04* (2006.01)
*B23B 41/08* (2006.01)
(52) U.S. Cl. .................... 137/318; 30/94; 408/102; 408/207
(58) Field of Classification Search ............ 137/318, 137/15.14, 315.41; 408/137, 102, 207, 22; 30/93, 94
See application file for complete search history.

(56) References Cited

U.S. PATENT DOCUMENTS

| 5,345,964 A | 9/1994 | Friedel |
| 5,400,492 A | 3/1995 | Hodgson et al. |
| 6,260,573 B1 * | 7/2001 | Lehmann et al. ........... 137/318 |
| 6,470,907 B1 * | 10/2002 | Sato et al. ................. 137/318 |
| 6,758,237 B1 * | 7/2004 | Sichler et al. .............. 137/318 |

FOREIGN PATENT DOCUMENTS

| DE | 2709466 | 1/1979 |
| DE | 3725240 | 2/1989 |
| DE | 19900550 | 6/2000 |
| GB | 1229175 | 4/1971 |
| GB | 1263053 | 2/1972 |

* cited by examiner

*Primary Examiner*—Kevin Lee
(74) *Attorney, Agent, or Firm*—Dennison, Schultz & MacDonald

(57) ABSTRACT

A device for producing bypasses under pressure in fluid piping systems, including a horizontal T-shaped body having a radial conduit which can be connected to a connecting collar or seat of the pipe to be bypassed and a radial conduit with a mouth for extracting fluid from the bypass. The device includes an inverted cup-shaped cutter with an overdimensioned tooth crown and, on the rear part thereof, a stepped extension with two threaded areas. One of the threaded areas is attached to the upper neck of the radial conduit and is closed with a cover and gaskets. The device further includes an actuation means which can be positioned on the neck and which is equipped with a feed screw and a shaft which can be connected to the end threaded area of the cutter by means of a male connector and a nut. The actuation means also includes a lateral valve which connects the outside with the inside of the radial conduit and the bypassed pipe by means of a chamber inside said actuation means and which can be used to inject an inert gas, check the sealing and purge the bypassed pipe.

33 Claims, 21 Drawing Sheets

Fig.18
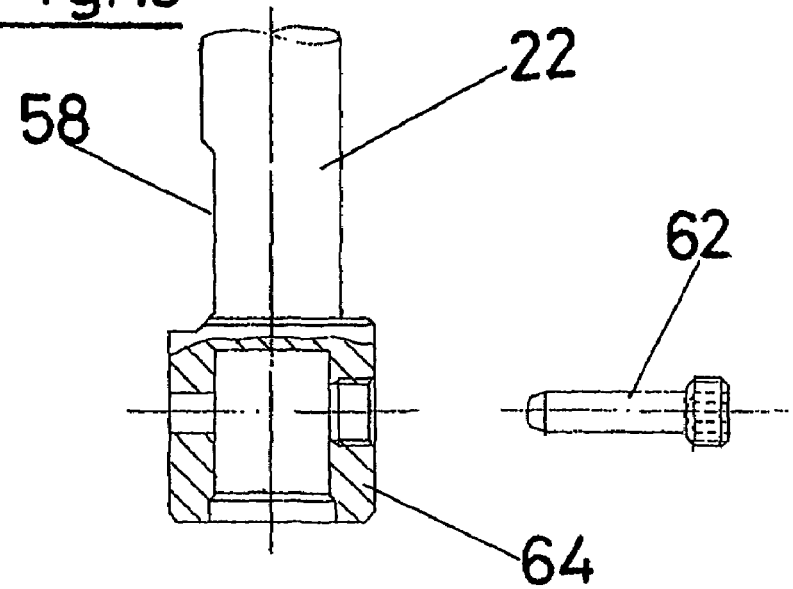
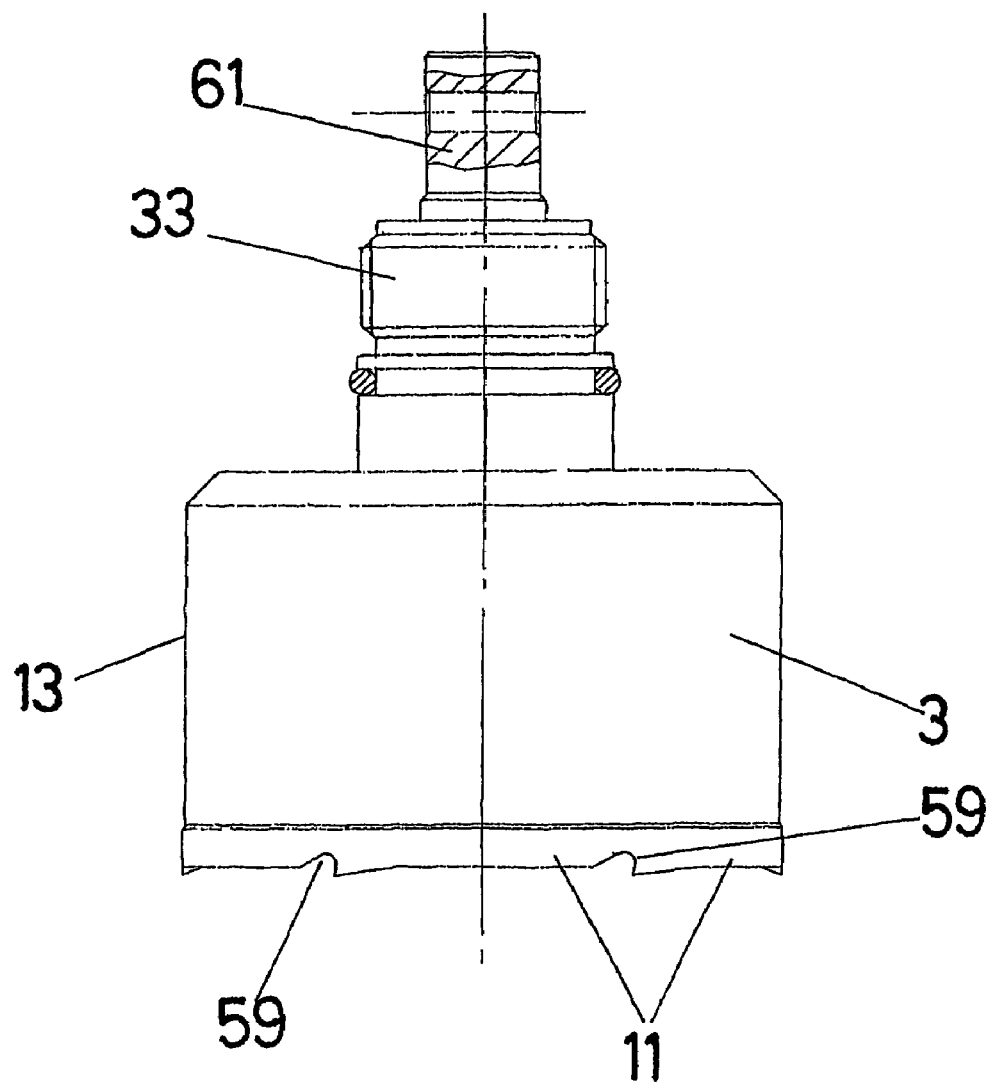

DEVICE FOR PRODUCING BYPASSES UNDER PRESSURE IN FLUID PIPING SYSTEMS

This application is a filing under 35 USC 371 of PCT/ES2003/00282 filed Jun. 11, 2003.

OBJECT OF THE INVENTION

The present patent application has as an object the registration of a device for producing bypasses in fluid piping systems constituted of pipes such as those used for the supply of fluids, for example water or gas, and incorporating remarkable innovations and advantages compared to the current devices and apparatuses for an equal or similar purpose.

More specifically, the new invention comprises a T-shape bypass which can be coupled to the distribution pipe by means of a suitable seat or collar. Said T-shape has a cutter in the radial conduit for the perforation of the pipe and means for its actuation and removal in a leak-tight manner, and the fluid extraction outlet of the bypassed conduit being joined to said radial conduit. The cutter comprises means for holding an external tool for its handling. Said tool furthermore enables checking the leak-tightness of the bypass and the extraction of the internal air with an inert gas, useful in the case of gas conveying conduit bypasses. Furthermore, the device and the trepanning tool comprise a series of elements favoring the increase of the safety of the device and facilitating the work of the operator by preventing false pressure measurements by means of a fluid or air exhaust conduit when the cutter is not in its corresponding place.

BACKGROUND OF THE INVENTION

Currently, there are a wide variety of bypass devices available on the market for carrying out an extraction of a piping which is subjected to pressure and in service. For example, the use of these devices by water and gas supply companies is common, since it enables carrying out system bypasses or the connection of the pipe of a new client to the general distribution pipe which is usually in service and which cannot cease to be used for the distribution of the fluid. Some of these devices generally comprise a collar for coupling to the pipe and the specific T-shaped bypass thereon. Said collar is joined to the pipe by means of a mechanical joint, whether it is by directly screwing, by welding on its surface or gluing. The T-shaped bypasses, also joined by mechanical means, gluing, welding or integrally manufactured, are arranged on said seats.

Said T-shaped bypasses are constituted of a main conduit having internal threading along its entire length. A cutting tool, such as a drill bit, cutter or the like having a matching helical thread in its outline is coupled in said thread, such that it can move longitudinally in the threaded inside of the conduit by means of an external wrench. When this cutting tool reaches the lower portion of the conduit, it makes contact with the surface of the pipe to then perforate it due to its progressive feed. Once the hole is made, the bypass is sealed at its upper portion to prevent leaks existing between the cutter and the conduit. In current T-shaped bypass systems, leaks of fluid to the outside during the drilling process cannot be prevented, nor can pressure be checked, nor inert gas injected, necessary in gas installations to evacuate the air from inside the new conduits. Due to the constructive methods used, the current T-shaped bypasses have a size limit.

DESCRIPTION OF THE INVENTION

The device for producing bypasses under pressure in fluid piping systems object of the present invention is characterized in that it comprises a means of carrying out the hole with complete safety, conserving the disc cut by the cutter, along with the shaving produced, in a safe manner outside of the fluid flow. It furthermore comprises improved leak-tightness means and systems for carrying out the leak-tight test and replacement of the air with an inert fluid in situ.

In fact, the device comprises a general external structure of a formation similar to a conventional bypass apparatus, with the main conduit arranged in a notably radial manner with connection through the seat and the side extraction conduit to connect the device with the fluid outlet conduit forming said T-shape.

The new invention comprises a cutter in the radial conduit or main conduit for the perforation of the pipe to be bypassed. The cutter generally has the shape of an inverted cup with a lower toothed crown and threading at its upper portion of a different diameter. The radial conduit has a threaded neck at its upper portion where the cutter is fixed in its attached position. On its outer profile, this neck has another thread for fixing an external cover with a gasket and for the coupling of the perforation tool.

In an embodiment example, in the upper portion of the cutter there is a threaded extension, of a diameter which is less than the thread for fixing to the neck, which inside has a hollowing out for the coupling of the perforation tool, such as a hexagonal cavity or the like. The feed shaft of the tool is held in this extension by means of a corresponding male connector and a threaded securing nut.

Another safer example has also been provided in which the joining between the cutter and the screw shaft can be by means of a pin traversing the head of the cutter and the coupled shaft. In fact, the cutter can comprise a cylindrical or tapered male connector which can be coupled to a conjugated mouth at the lower end of the shaft and there being in both a transverse perforation in which said pin can be housed. Should the user forget to place the pin, the screw shaft does not transmit any force to the cutter and the latter cannot be extracted from the threaded area of the bypass, something which would be possible with a coupling by means of a hexagonal head. To prevent the pin from being able to come out of its housing during the work, said pin is partially threaded, being coupled to the mouth of the end of the shaft.

The teeth of the crown internally have internal screw threads securing the disc to the cutter once the hole is made. The pitch of these screw threads is the same as the pitch of the feed of the perforation tool. Shavings of the material of the perforated pipe are produced with the perforation, which, for example, if it is a plastic pipe, are redirected to the inner portion of the cutter behind the disc, so that they are confined and do not pass to the circulating flow where they could cause jams and breakdowns. Said shavings are directed by the teeth of the cutter, which have a lead surface beveled toward the inside, causing the sought after effect. Furthermore, the teeth are externally overdimensioned with regard to the body of the cutter for the purpose of preventing frictions between the cutter and pipe during the perforation.

Said design of the teeth enables the disc to be firmly retained inside the cutter, whereby it is possible to carry out large sized holes without the disc or the remains produced being able to cause problems by being released and falling into the conduit.

In order to more safely retain the extracted disc of the pipe, it has been provided that the cavities between teeth of the cutter are as small as possible, thus hindering the falling of the shaving. Furthermore, the screw threads of the teeth can be shifted toward the hollow inside of the cutter, being interrupted by empty spaces. The disc cut from the pipe, usually of a synthetic material, expands and is better fixed and secured.

In an alternative embodiment, the cutter can have its lower portion tapered, such that it can act as a bypass valve. In fact, if desired, the cutter can have in its upper portion, opposite to the crown, a tapered flaring of a diameter exceeding the diameter of the perforated hole, such that when it is fed through the tool against the pipe, it plugs said hole. This flaring is arranged in a position below the two upper threads so that it does not interfere with them. The cutter therefore has a utility after having made the hole in the pipe, complementing the needs existing in any bypass.

The perforation tool comprises a tubular body which can be coupled on the neck of the radial or main conduit of the device which, at its upper portion, has a screw with movement of an internal shaft, which can be coupled to the upper portion of the cutter. In a first means of joining the cutter to the shaft, the latter has a male connector at its end corresponding with the previously mentioned hexagonal hole and a securing nut with a threaded outline of the extension of the cutter. Close to the male connector, the shaft has a retention ring for retaining the nut. This ring prevents the securing nut from becoming lost and from being able to assemble the perforation tool without fixing the shaft to the cutter. The outer body has a lower mouth through where the shaft with the attaching male connector is arranged in a projecting manner. In the inner outline of said mouth, there is a screw thread which can be coupled to the outside of the neck of the radial conduit. This mouth is extended in the rear portion in a space connecting with the inside of the radial conduit when the cutter is shifted toward its interior. This chamber is in turn connected with the outside by means of at least one bypass valve. Said valve serves to carry out the leak-tight test of the installation once the bypass is connected and before making the hole in the pipe. Furthermore, purging of the installation can be carried out through this valve if needed.

The valve can have quick connectors which are standard and very easy to use.

The tool can optionally have two valves. It is thus possible to perform said pressure test more easily than with common tools of the operator, given that the verification pressure gauge can be connected in one of the valves and the pressure source in the other one.

The body of the perforation tool has a screw at the upper portion for the shifting of the shaft. Said shaft is introduced axially in a sliding manner inside the screw, such that it can take on different shifting ratios, therefore the screw may be shorter than the longitudinal shifting of the shaft defined between the position of the cutter coupled to the upper neck of the radial conduit and the cutter in the perforation position, said shifting being carried out simply by pushing or pulling of the shaft. Furthermore, the sliding shaft enables the radial conduit to have a great length if considered appropriate. The joining between the shaft and the screw is carried out by means of a pin inserted in a transverse-housing existing in the upper portion of the screw. The shaft has a series of transverse holes which can be facing with this housing, allowing for the entry of the pin and their mutual interlocking, whereby the assembly is joined together for its handling. In order to prevent that said pin does not come out or become lost, it has a retention ring at the end opposite to the projection of the screw. Furthermore, said ring enables the pin to be able to act as a quick actuation lever when the hole of the shaft in which it is going to be interlocked is sought. The shaft of the perforation tool has a coupling for a standard wrench or the like at its upper end for rotation thereof. The screw has a circular groove close to the end of its trajectory for the purpose of warning the operator of the proximity of the end of the thread.

To make the bypass hole and after having joined the seat of the device to the pipe, the shaft of the tool is joined to the upper portion of the cutter. Then the body is screwed on the neck of the radial conduit of the device, sealing the assembly. By turning the shaft, the cutter is unscrewed from its inner seat in the neck and advances toward the pipe. This shifting of the cutter between the upper neck and its contact with the lower pipe occurs in an easy manner, by simply pushing the shaft, as neither its screwing nor establishment of contact whatsoever with the walls of the radial conduit are necessary.

When the cutter comes into contact with the pipe, the screw is screwed on until reaching a position enabling the introduction of the pin, maintaining the maximum "L" stroke possible. Once the pin is introduced in one of the holes of the shaft which enable the joining of said shaft and the screw, the shaft is rotated so that the teeth of the cutter bore through the surface of the pipe, until separating the perforated disc, the hole thereby being made. Next, the screw is unscrewed until it comes out of the thread and the shaft of the tool is stretched to a maximum, until the cutter reaches the neck and is actuated in the reverse direction until the cutter is completely screwed in the inner seat of the neck, again providing a leak-tight closure of this end of the device. The outer body is unscrewed and the shaft is released from its housing in the head of the cutter. The neck is ready for the closure of the device by means of a cover with its corresponding gasket. Should the device be affected by vibrations, an anti-release nut can be placed, coupled with the upper thread of the extension of the cutter and supported on the upper surface of the neck of the radial conduit, covered by the cover.

As discussed, the cutter can comprise a set of cylindrical or frustoconical male connectors and mouths interlocked by means of a pin, threaded elements being dispensed with.

Furthermore, this coupling system enables the cutter to be secured at the upper portion of the neck of the bypass in a very simple manner when the tasks have concluded, since using a pin with an elastic ring, a clip or the like is enough to prevent the cutter from falling inside the bypass.

In view of preventing possible errors when carrying out the pressure test, it has been provided that the shaft has a longitudinal channel or groove affecting it in the area of the gasket and the bearing. This groove connects the inner chamber of the tool with the outside through the housing of the screw. When the cutter advances outside of the threaded area of the bypass, the shaft is completely leak-tight with the previously mentioned gasket, enabling carrying out the pressure test. However, if the cutter is not lowered in its correct position, but rather is coupled at the threaded area of the bypass acting as a plug, the pressurization gas or fluid exits through the space left by said groove to the outside, warning the operator of the error and preventing the false measurement.

Considering that the new invention is especially indicated for producing bypasses in service pipes, subjected to high internal pressure with regard to the outside, said internal pressure of the pipe to be bypassed can push the assembly of the cutter and the shaft when the hole has been made. Said outward extension is usually slow and progressive during the unscrewing of the screw and when this comes out of the thread, as it is accompanied by the hand of the operator. However, due to an incorrect handling, and due to the effect of the pressure difference between the inside of the pipe and the portion behind the cutter, the shaft can be expelled at a remarkable speed with the risk of causing lesions in the operator if he is in the lift path of the shaft. It has been provided that the body of the tool has an arch or protection covering the entire extension of the shaft, such that it makes it impossible for the operator to put his face or any other part of his body in the path of extension of the shaft, enabling the operator to be able to operate with the wrench for handling thereof.

Another way to prevent said risk consists of compensating the pressure difference existing between the pipe to be bypassed and the body of the bypass when said pipe is being perforated and the disc has still not been released. Thus, when the disc has been completely separated, since there is no pressure difference between the portion in front of and the portion behind the cutter or cutting tool, there is no force whatsoever lifting the shaft. Said compensation is carried out through holes existing in the outline of the cutter or cutting tool, arranged such that the shaving cannot exit, but the pressure of the fluid of the pipe which is filtered through the teeth and the disc can pass to the T-shaped bypass.

However, in a preferred use of the device, the upper closure of the radial conduit is carried out by means of a threaded cover, enabling access to the cutter at any time a posteriori, it has been provided that said closure and sealing can also be more definitive if more works are not going to be carried out. In fact, a cover can be arranged on the neck of the radial conduit which is fitted and covered by a sleeve encircling its outline and the extension of the radial conduit, both being suitable for their joining together by gluing, heat fusion in the case of plastic, welding or others.

The device of the new invention enables carrying out all the operations without there being leaks to the outside, preventing possible risks and enabling working with pipes subjected to higher pressures than in alternative bypass devices.

However, another measure proposed in this invention is that the bypass has a longitudinal groove in its threaded coupling for the outer closure cover which affects said thread, such that in the event of an accidental leak, the screwing and unscrewing operation of said cover is possible for the operator, given that the fluid accumulated in the space between the cutter and under the cover is evacuated with ease during the coupling and/or uncoupling of said cover. However, if the cover is completely screwed on, the gasket sealings prevent the leak from continuing, blocking the unwanted outflow.

To complete the description which will be made below and for the purpose of aiding to better understand its features, a set of illustrative and non-limiting figures is attached to the present specification in which the most significant details of the invention are depicted.

DESCRIPTION OF THE DRAWINGS

FIG. 18 shows an exploded view of an alternative for coupling the end of the perforation shaft with the male connector or head of the cutter.

DESCRIPTION OF A PREFERRED EMBODIMENT

Figure 1:
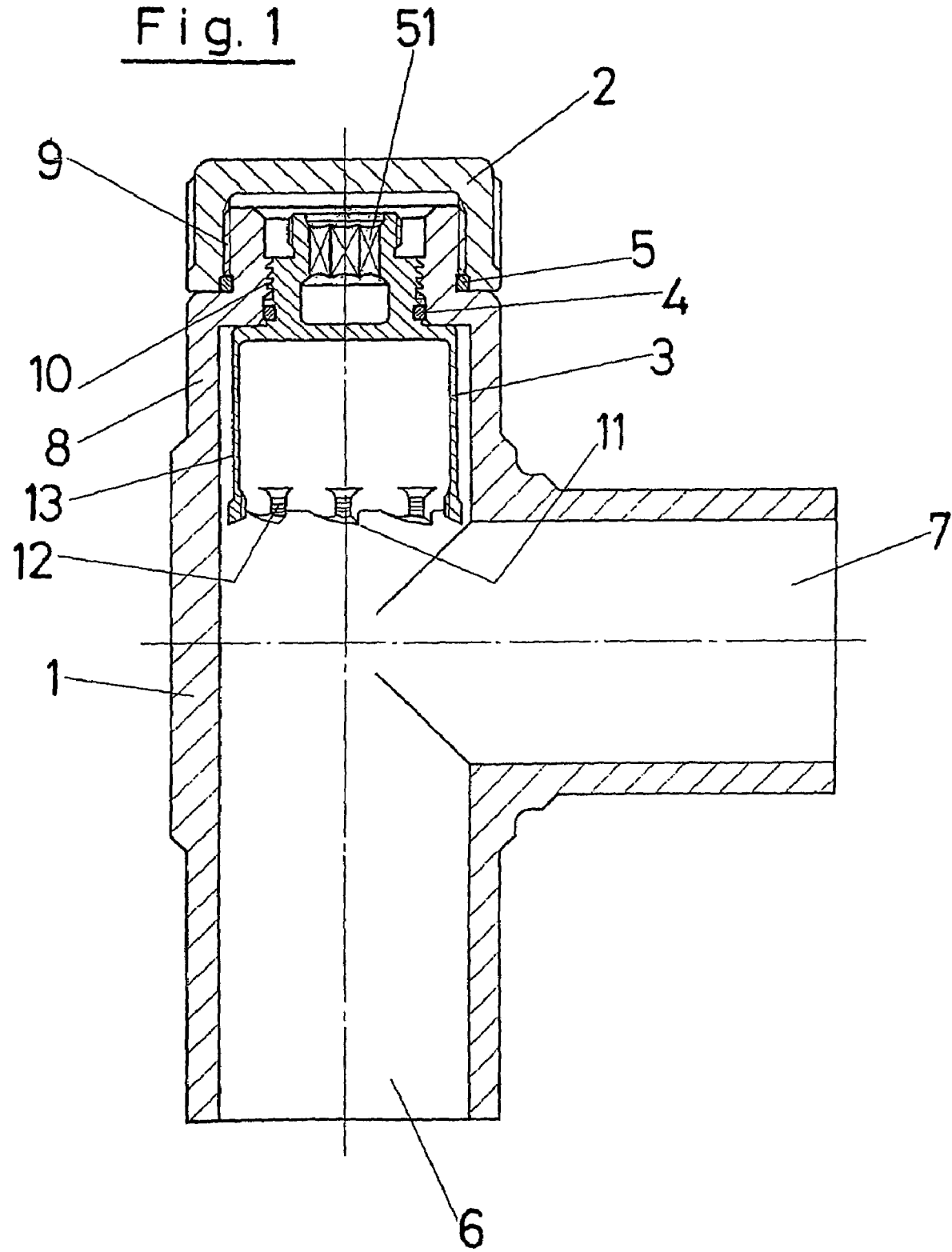
FIG. 1 shows a cut-away view of the T-shaped bypass of the device with the cutter at its upper portion and closed with a cover.
Figure 2:
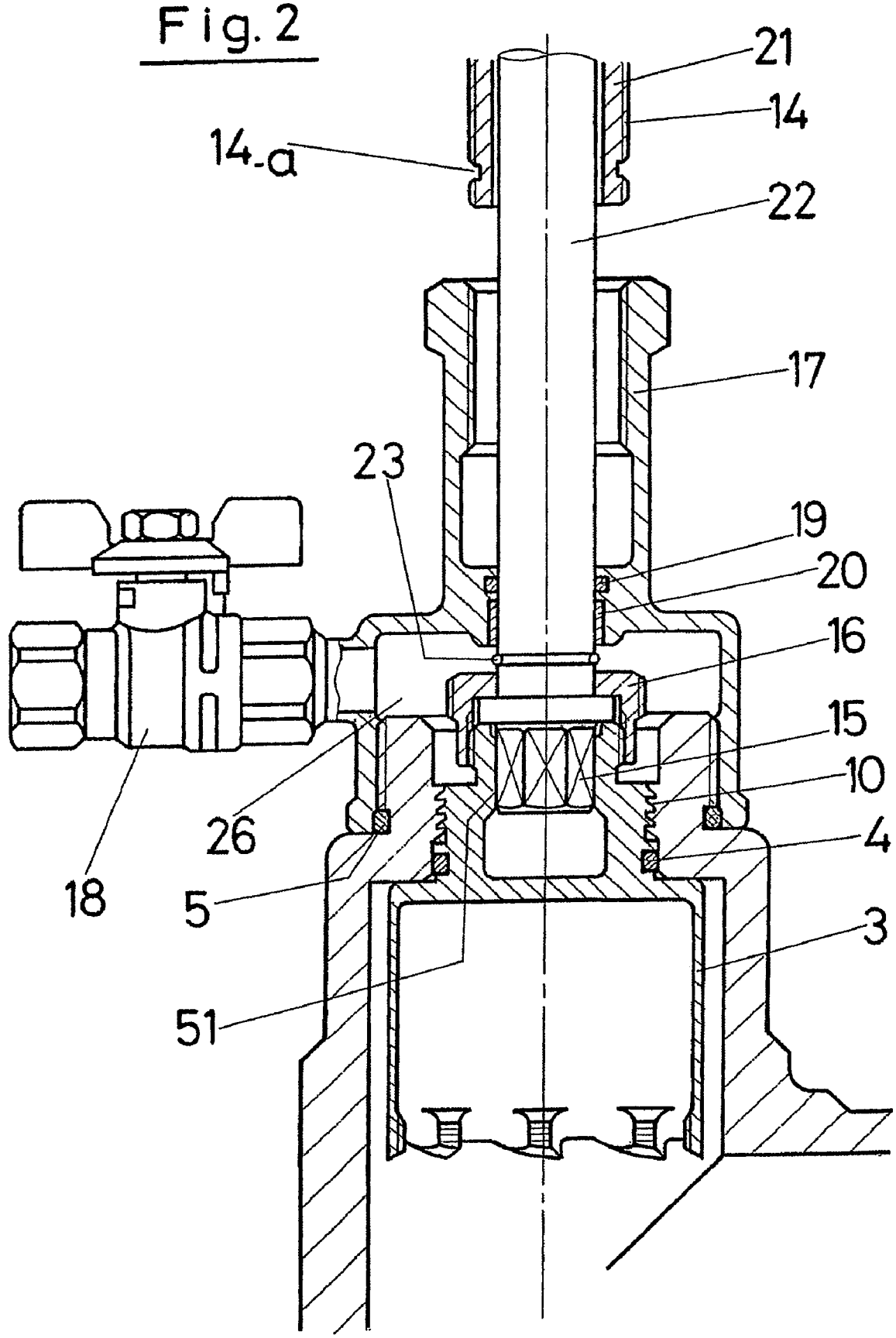
FIG. 2 shows a detailed cut-away view of the coupling of the perforation tool to the neck of the radial conduit and to the cutter.
Figure 3:
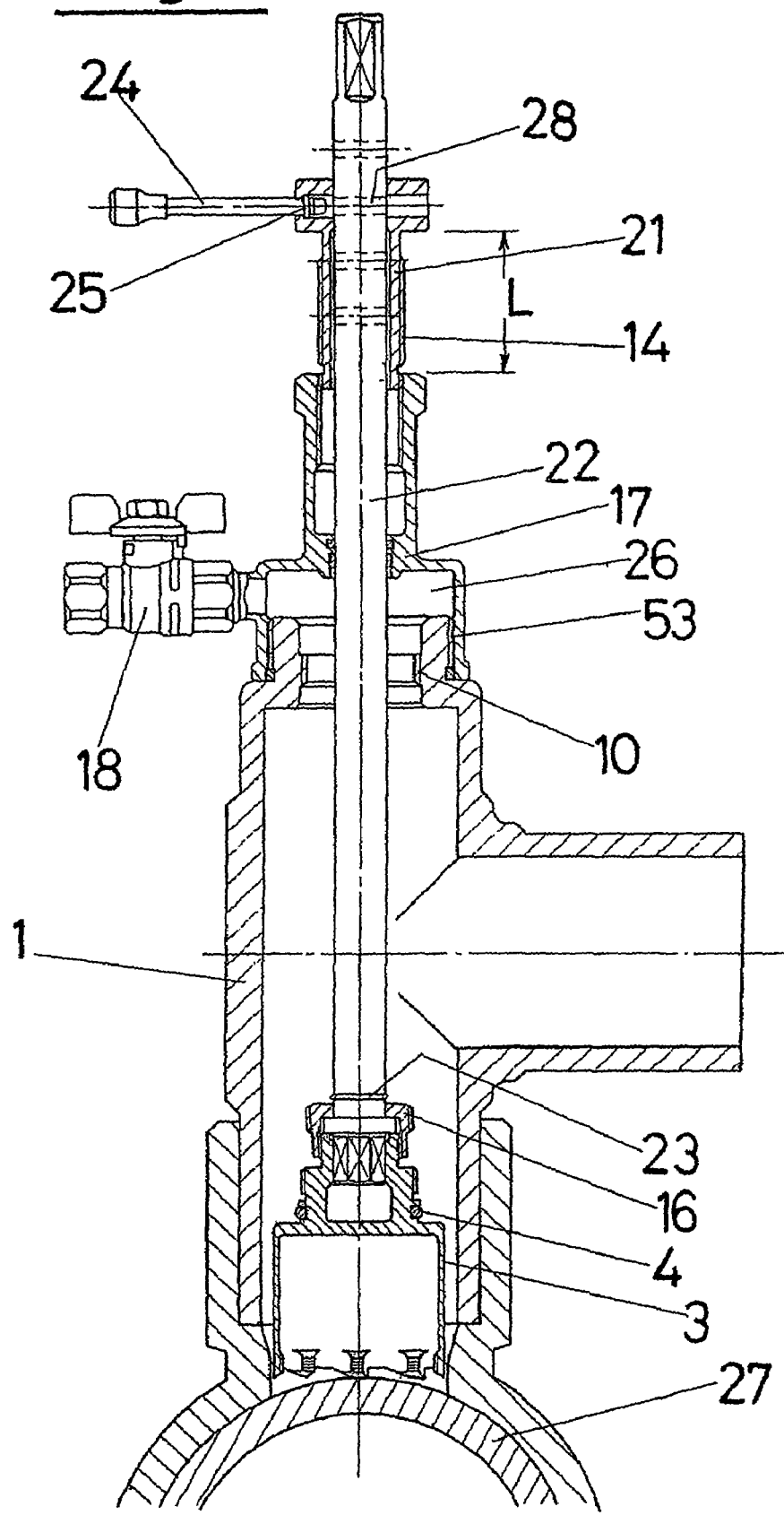
FIG. 3 shows a cut-away view of the entire device with the cutter introduced in the radial conduit.
Figure 4:
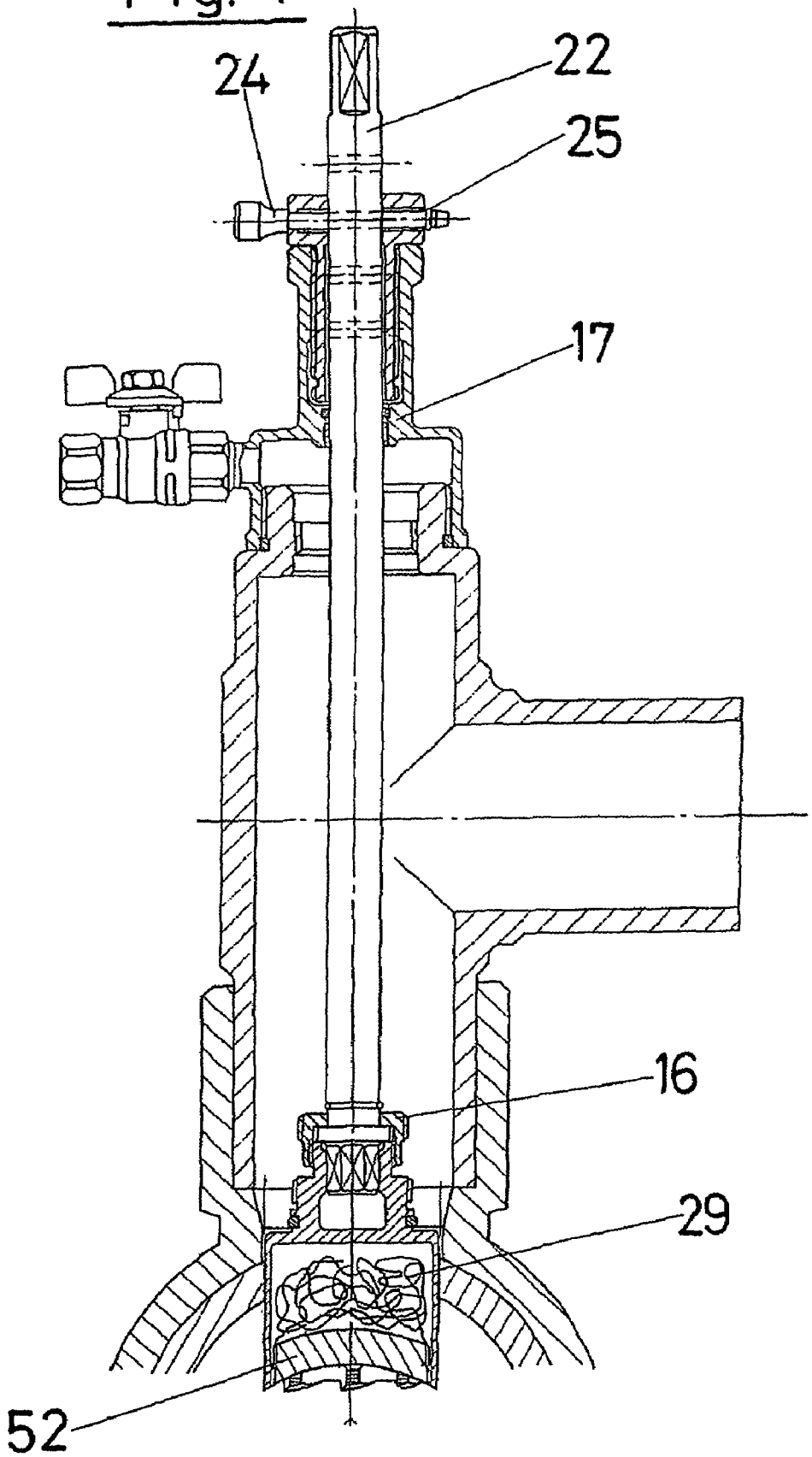
FIG. 4 shows a cut-away view of the boring of the pipe.
Figure 5:
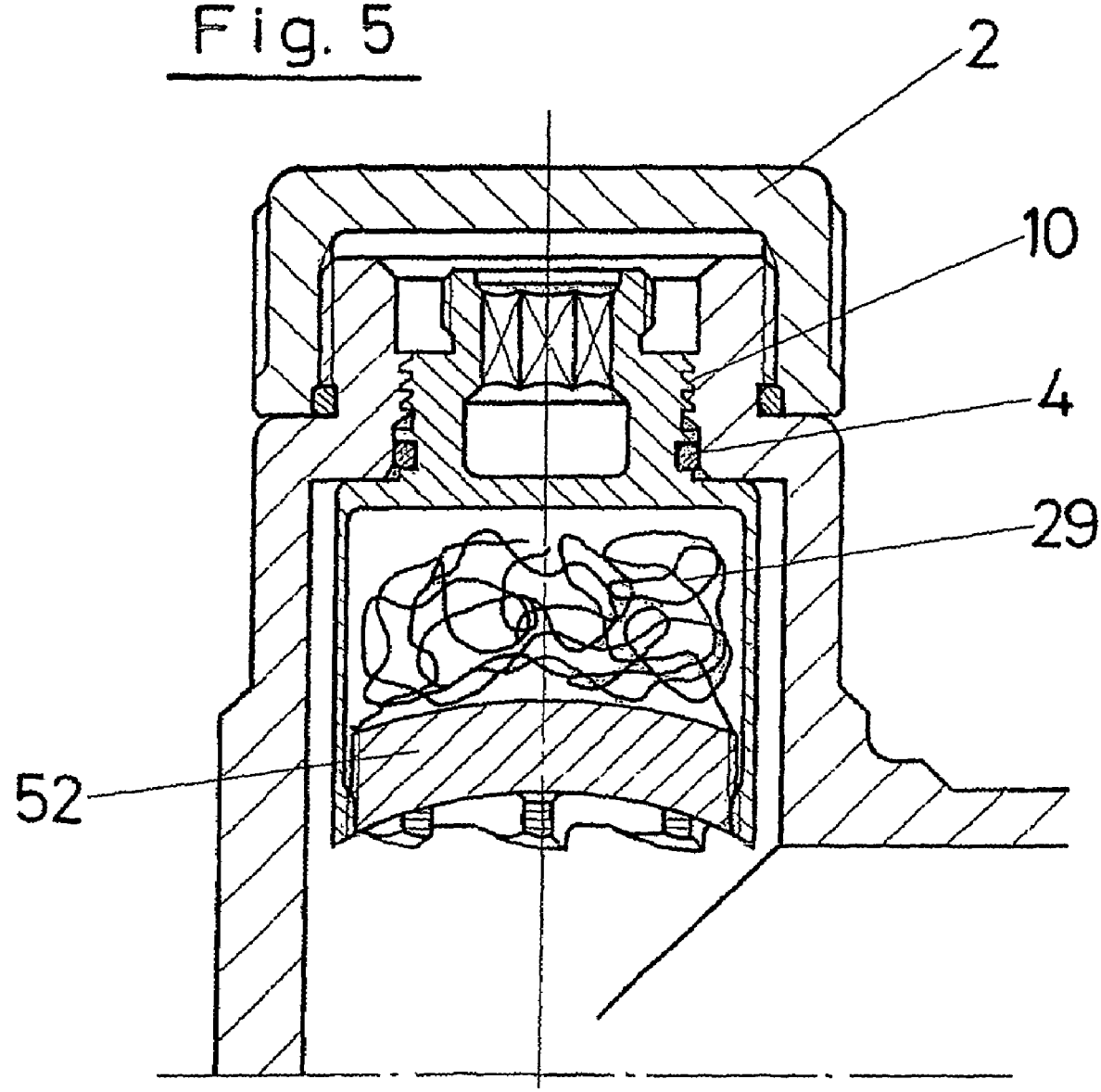
FIG. 5 shows a detailed cut-away view of the cutter coupled to the neck of the radial conduit with the disc collected.
Figure 6:
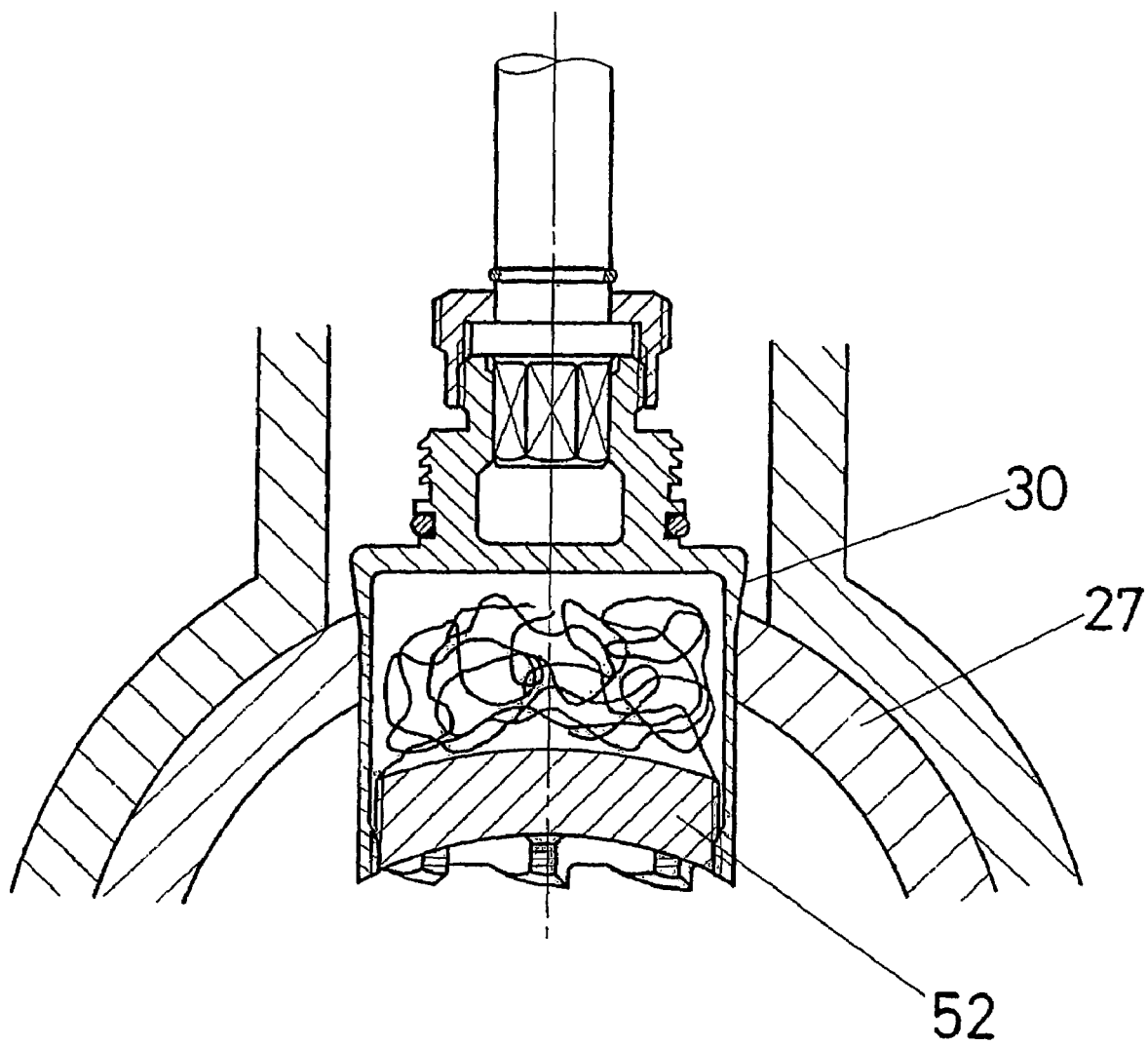
FIG. 6 shows a detailed cut-away view of the cutter against the pipe in the manner of a flow plug.
Figure 7:
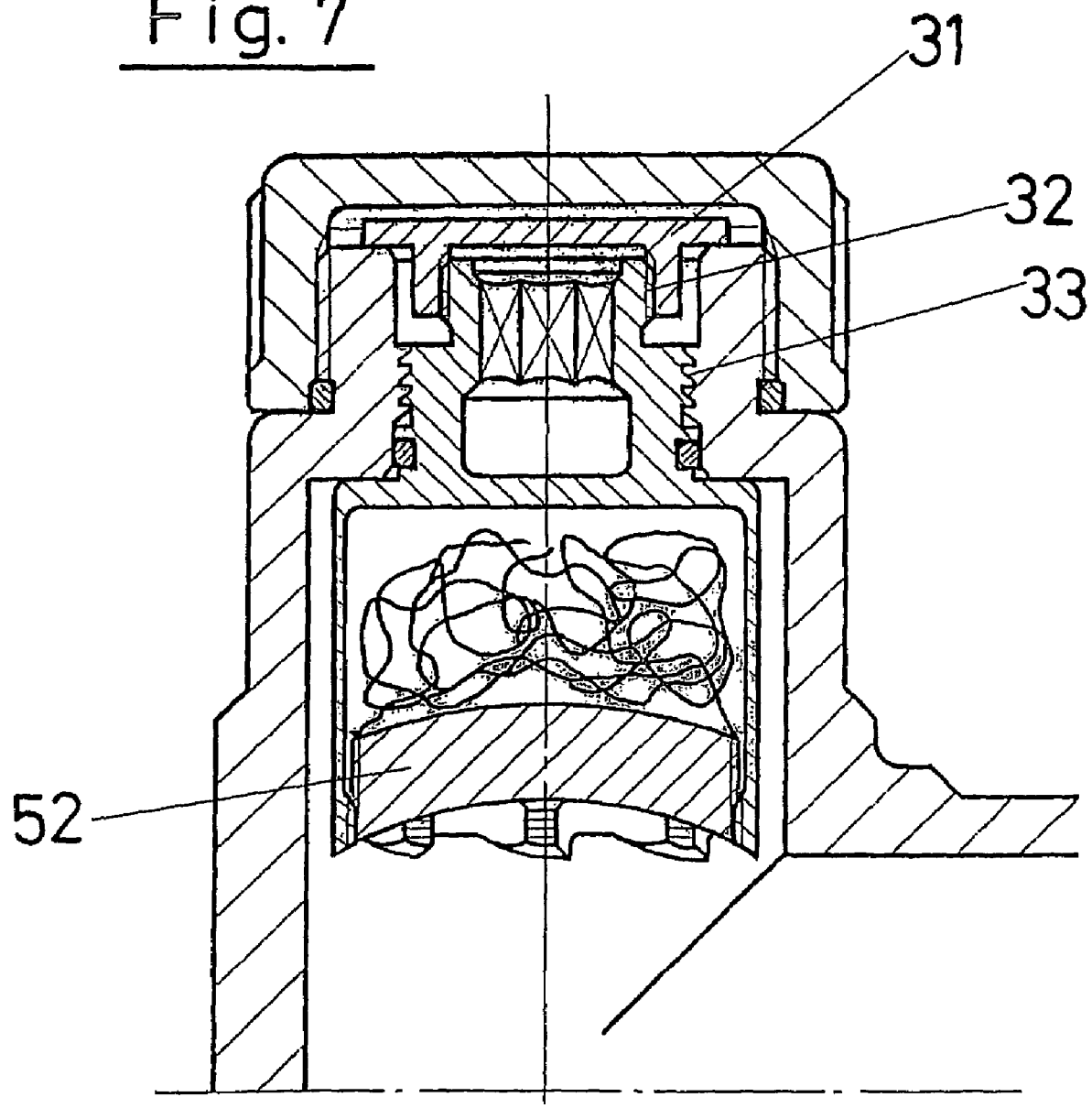
FIG. 7 shows a detailed cut-away view of the cutter with a coupled anti-release thread.
Figure 8:
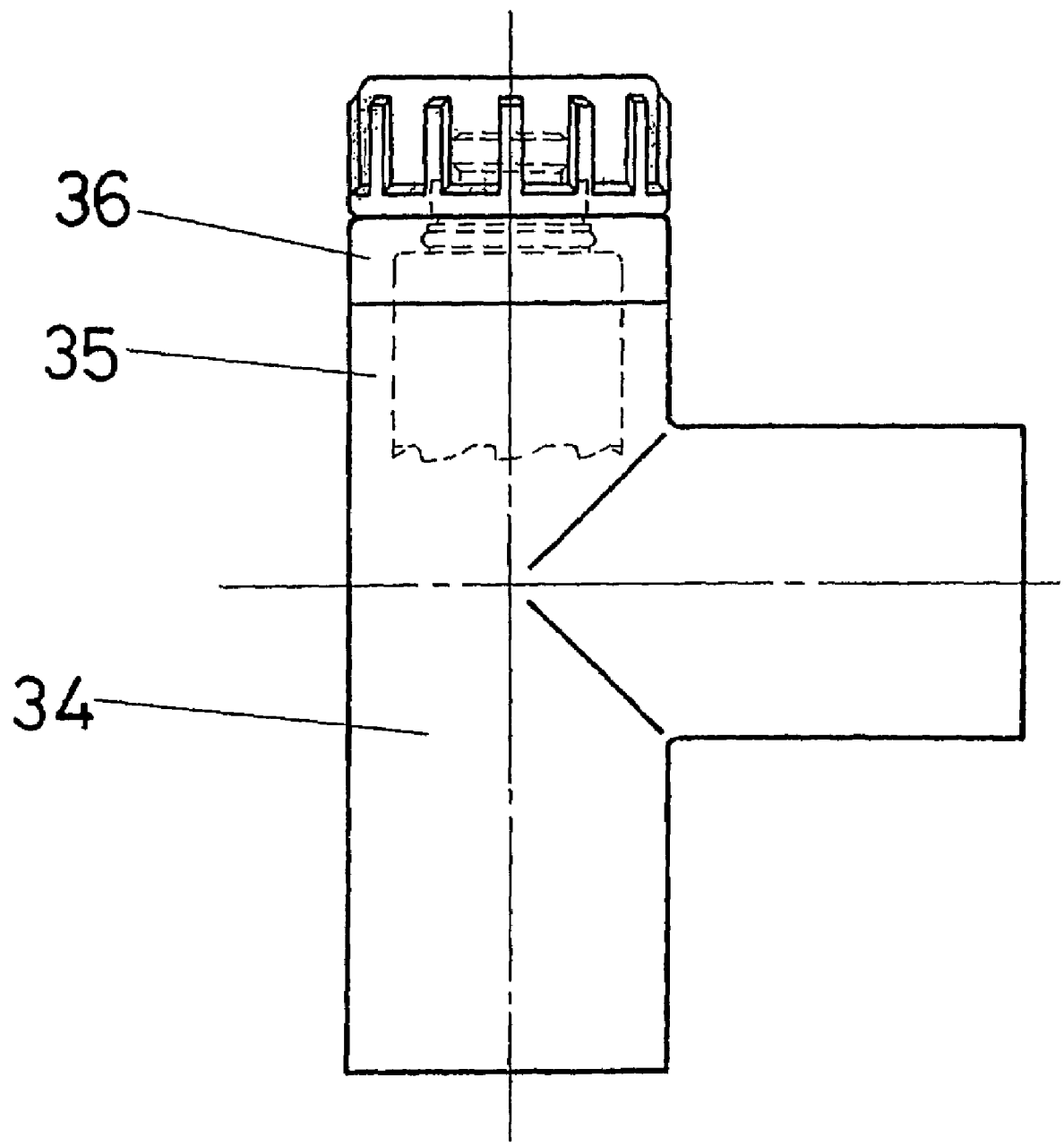
FIG. 8 shows a variant of the T-shaped bypass body constituted of a conventional T-shape and the coupling neck of the cutter welded or glued.
Figure 9:
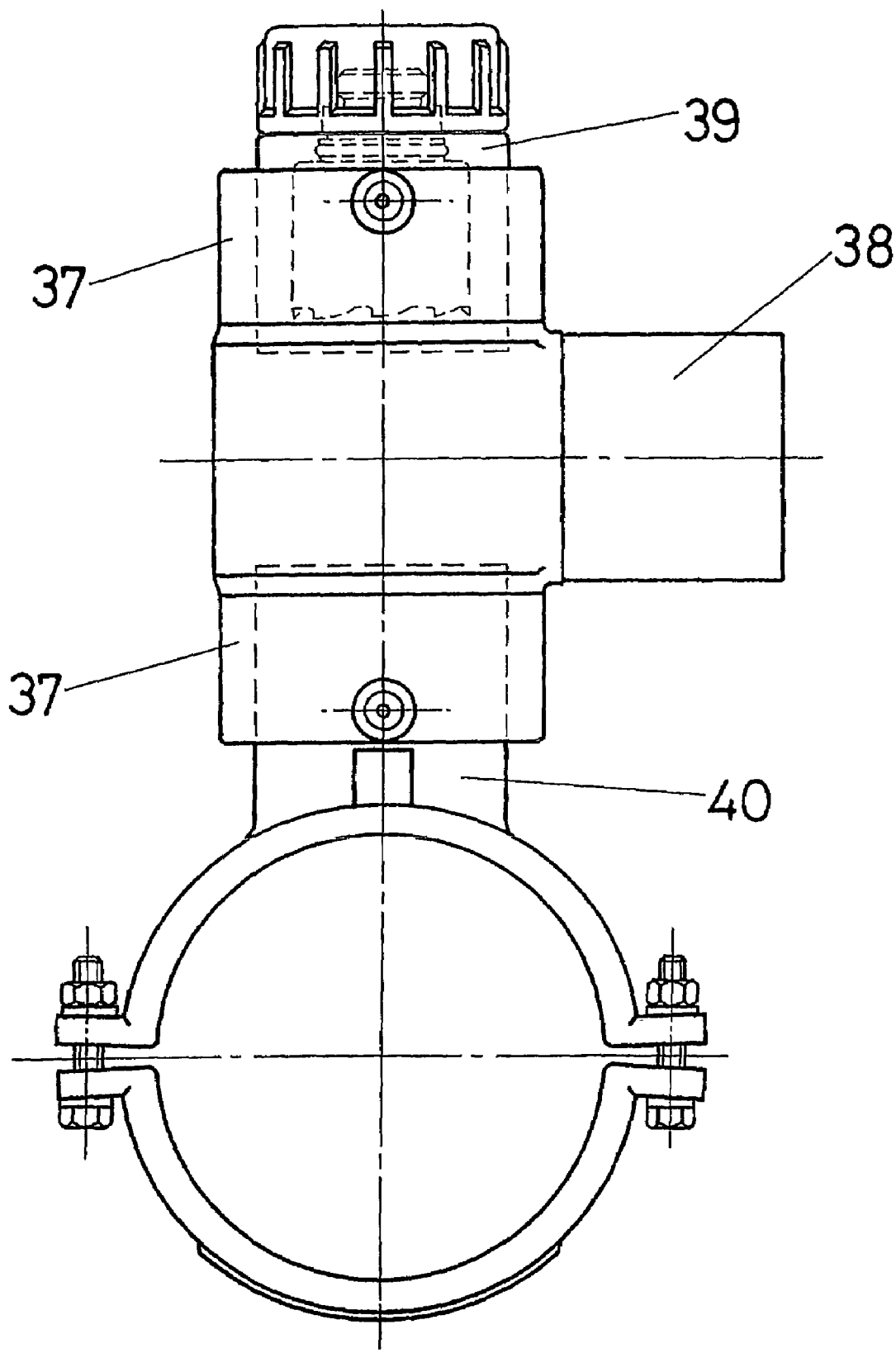
FIG. 9 shows a variant of the T-shaped bypass body constituted of a T-shape with female branches, connected to male conduits of the seat on the pipe and of the upper neck receiving the cutter.
Figure 10:
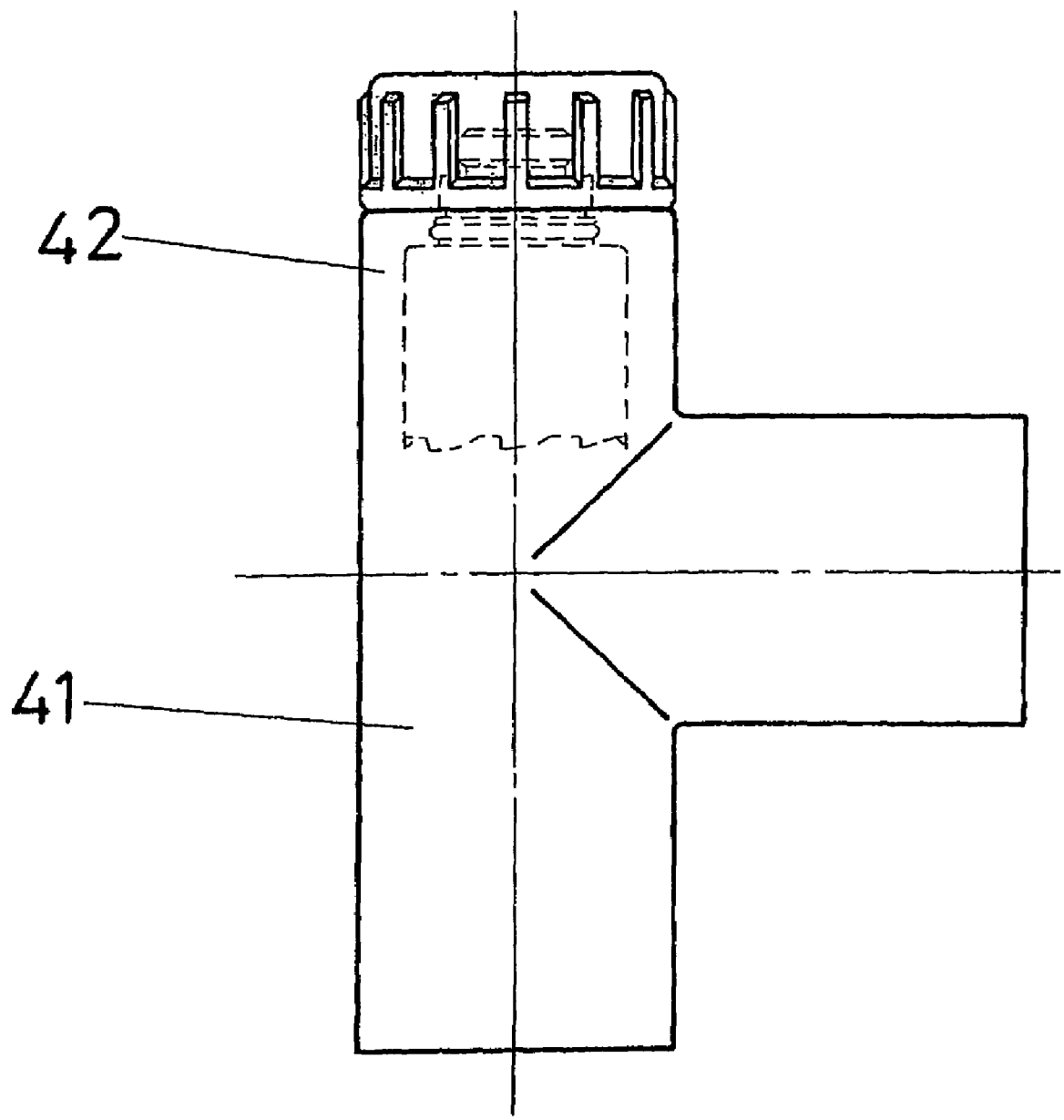
FIG. 10 shows a variant of the T-shaped bypass body constituted of a T-shape of one-piece manufacture, incorporating the cutter, the neck and the cover.
Figure 11:
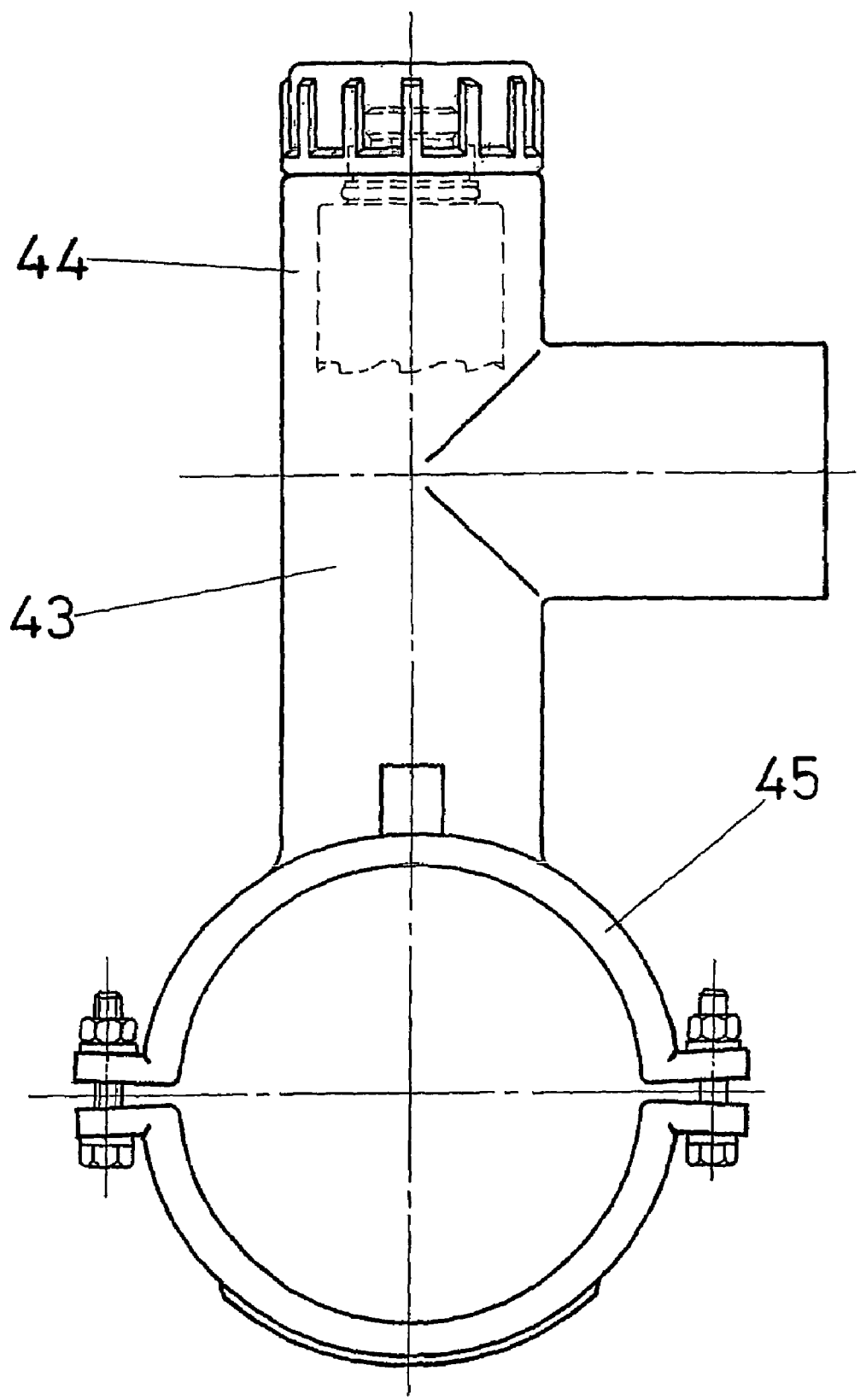
FIG. 11 shows a variant of the device with the T-shaped bypass body and the seat being one-piece and ready for use thereof, incorporating the cutter, the neck and cover.
Figure 12:
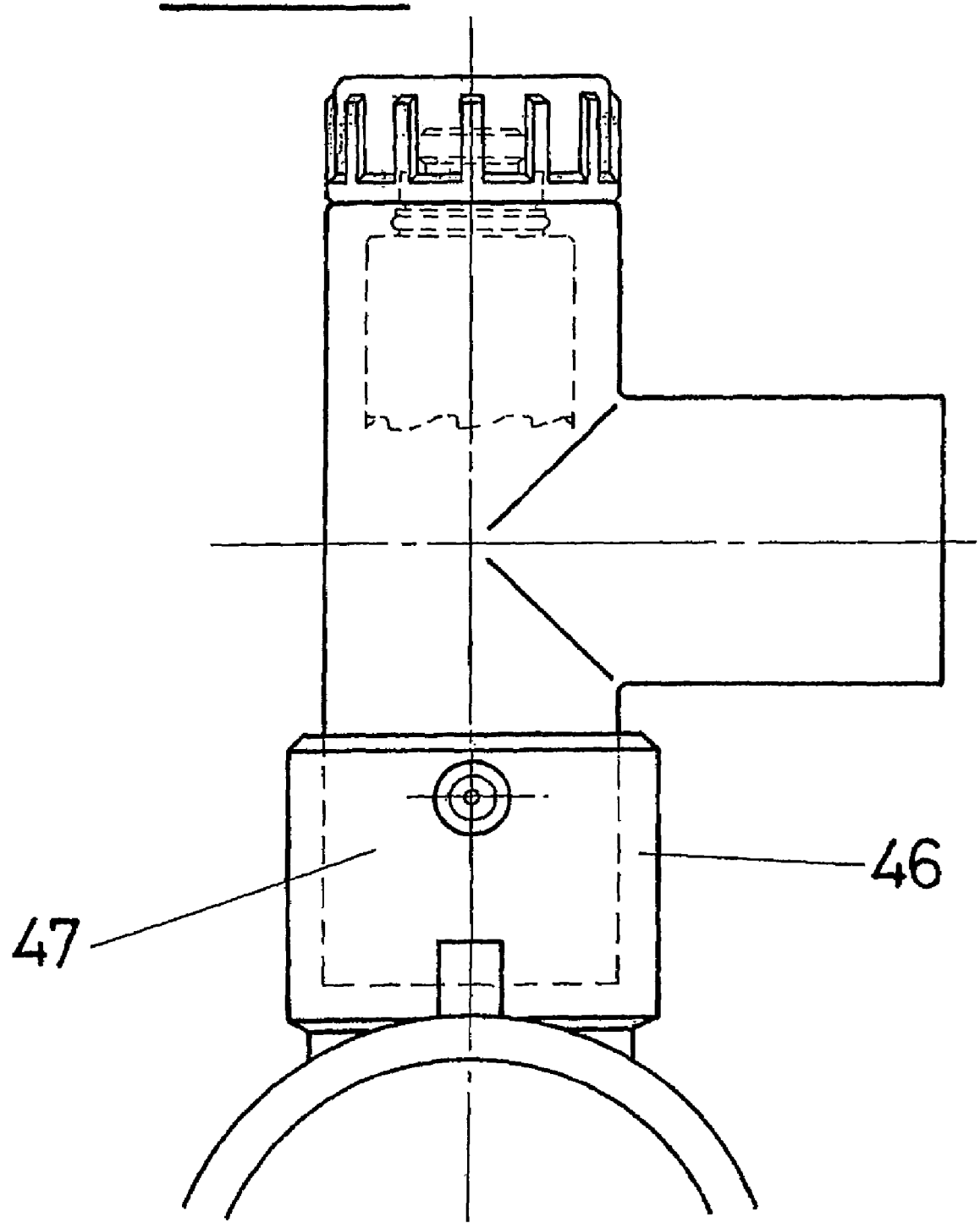
FIG. 12 shows a variant of the device with the T-shaped bypass body which can be coupled to a pre-existing seat by means of a male connector connected to the female connector of said seat.
Figure 13:
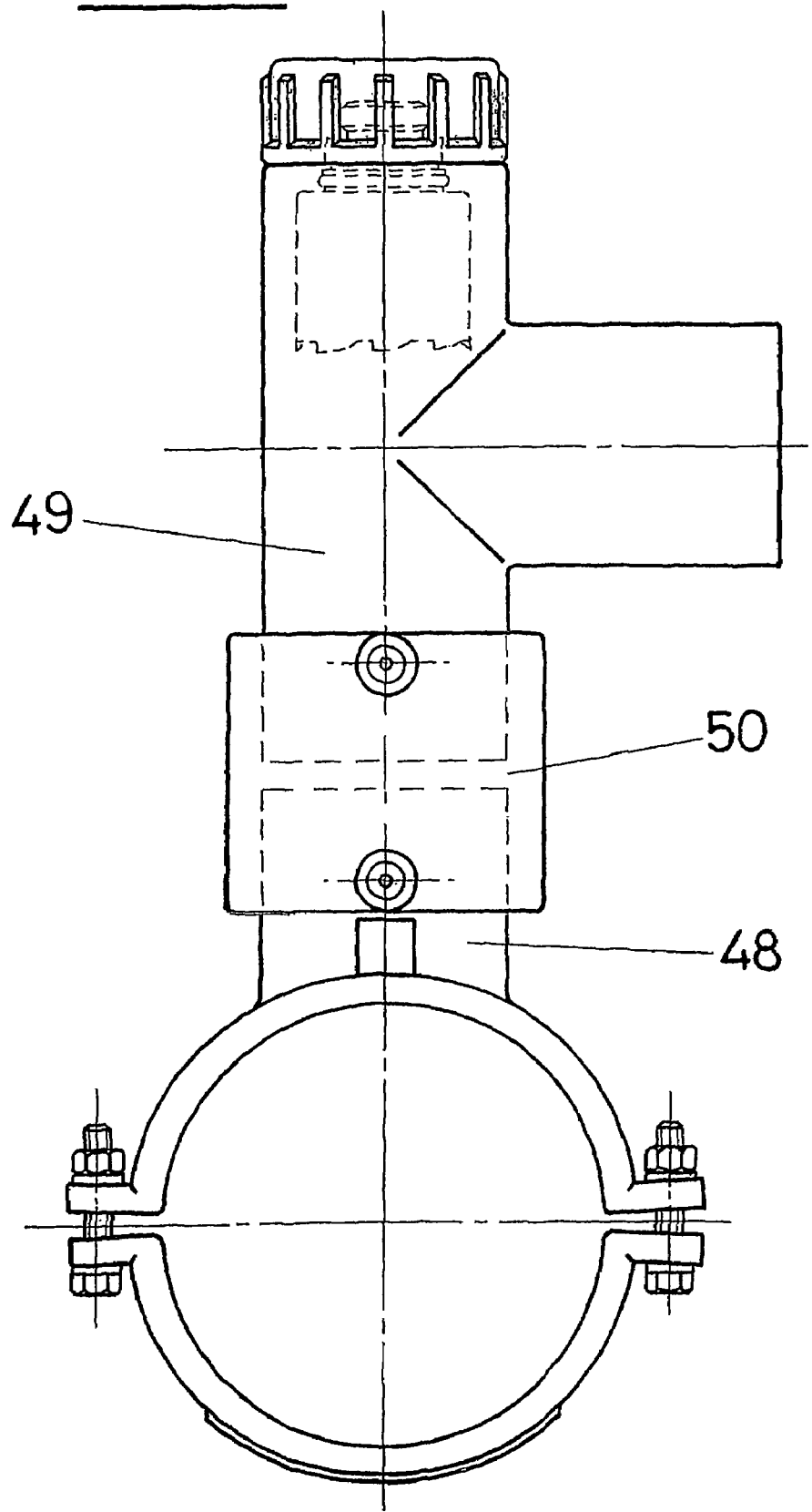
FIG. 13 shows a variant of the device with the T-shaped bypass body which can be coupled to a pre-existing seat by means of a double female sleeve connected to the male ends of the seat and of the bypass.
Figure 14:
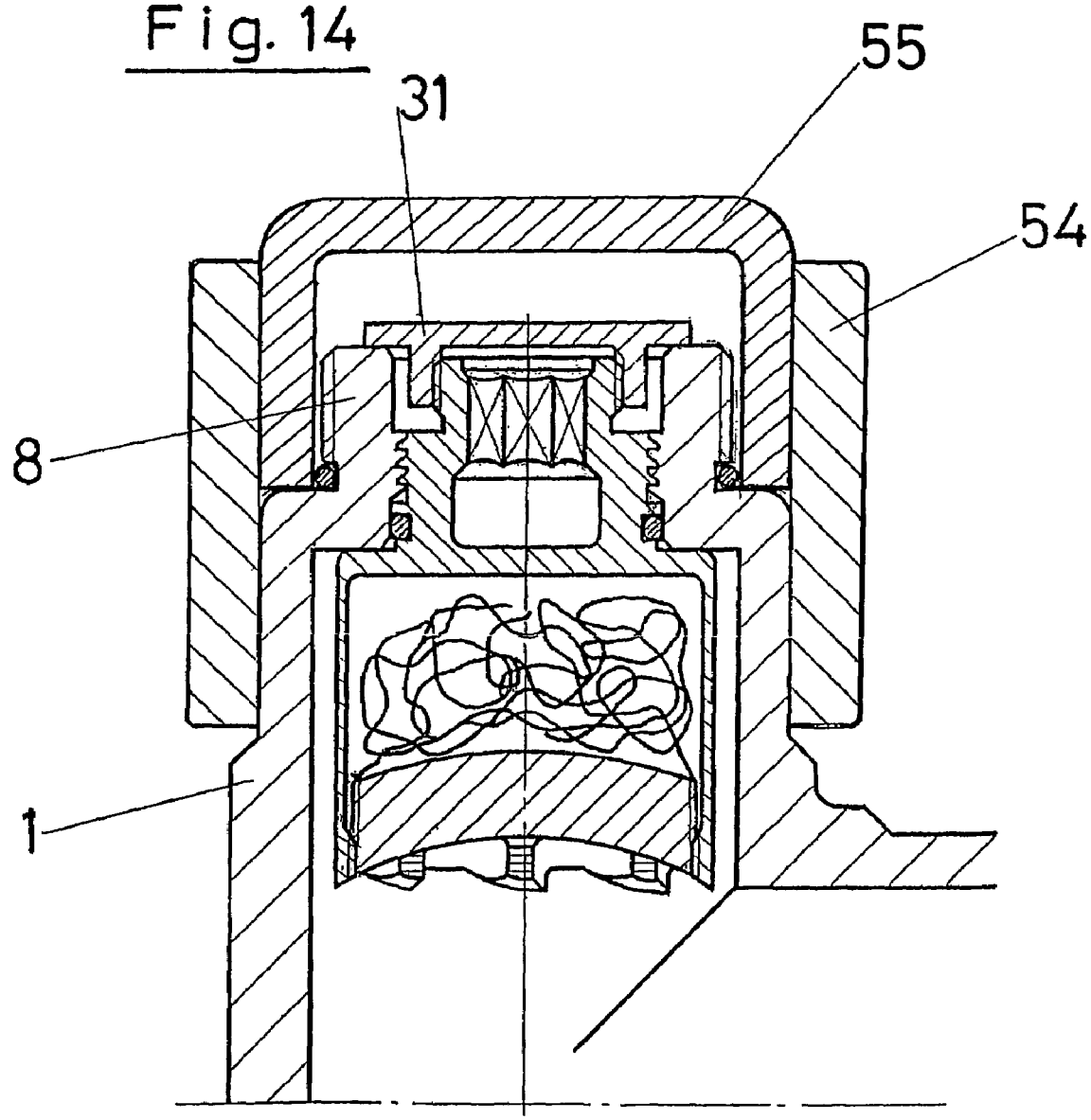
FIG. 14 shows a detailed cut-away view of the cutter with an upper closure by means of a heat-welded cover and sleeve assembly.
Figure 15:
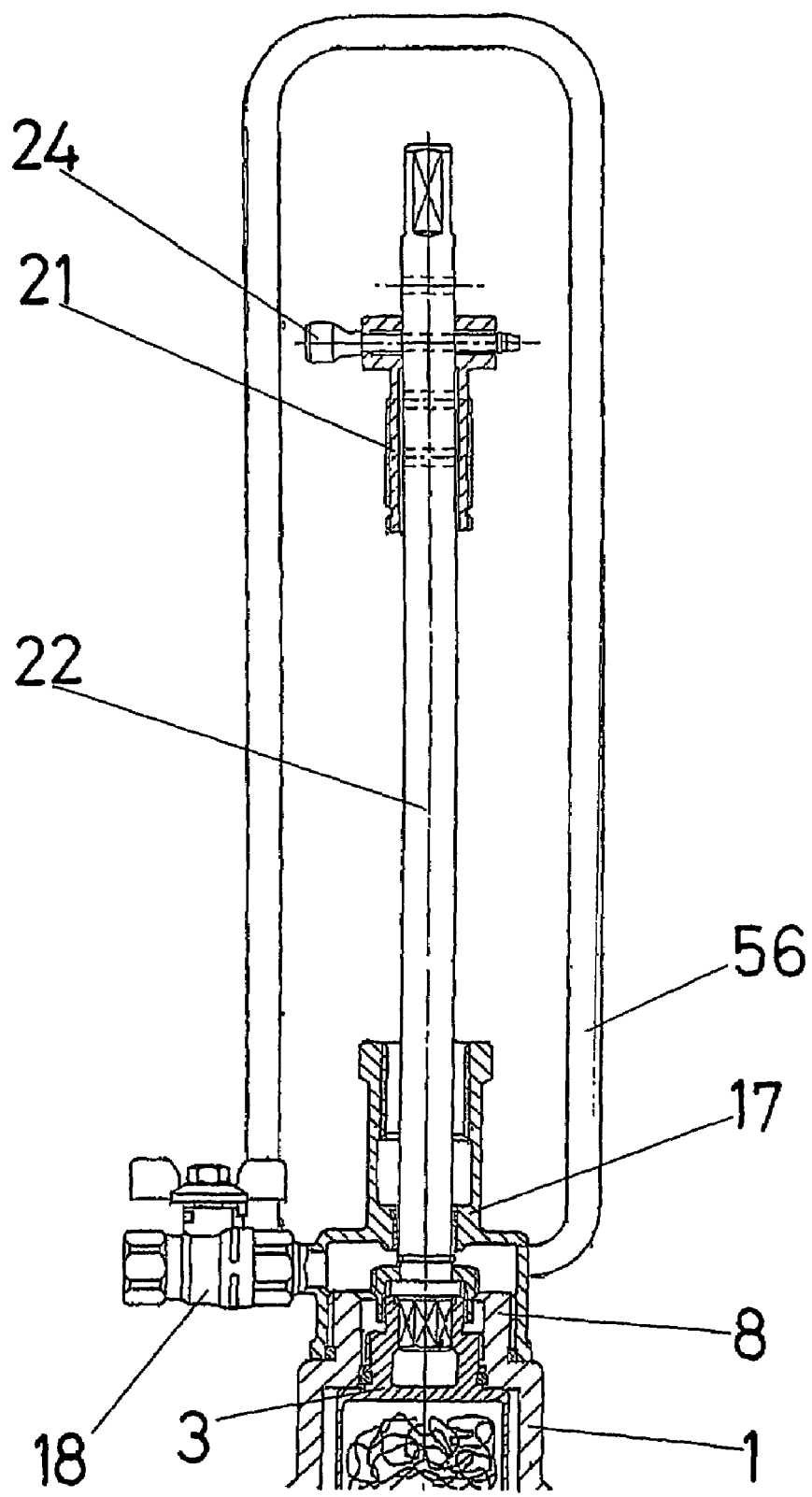
FIG. 15 shows a view of the upper portion of the tool with the protective arch around the extended shaft.
Figure 16:
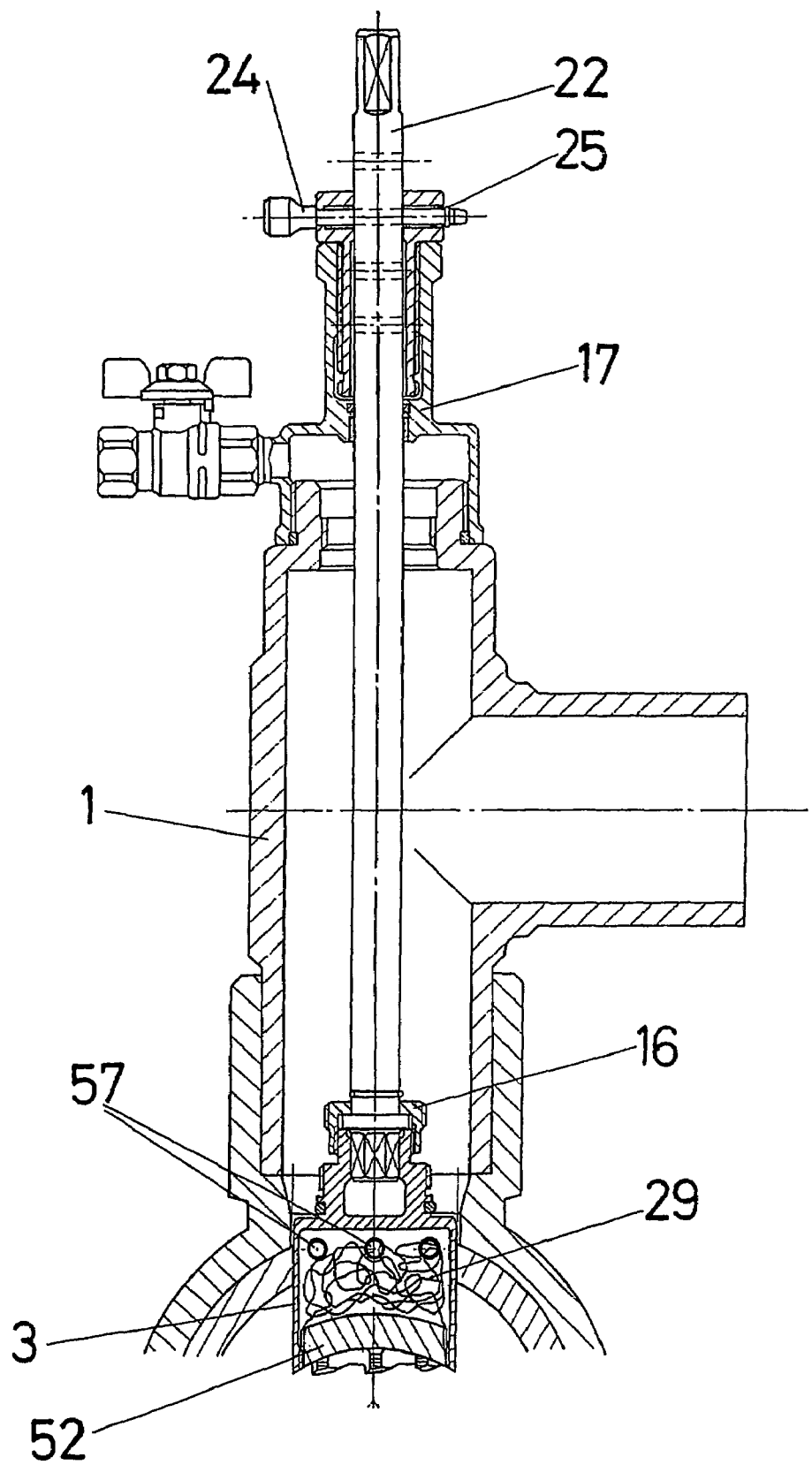
FIG. 16 shows a cut-away view of a cutter or cutting tool with the pressure compensation windows.
Figure 17:
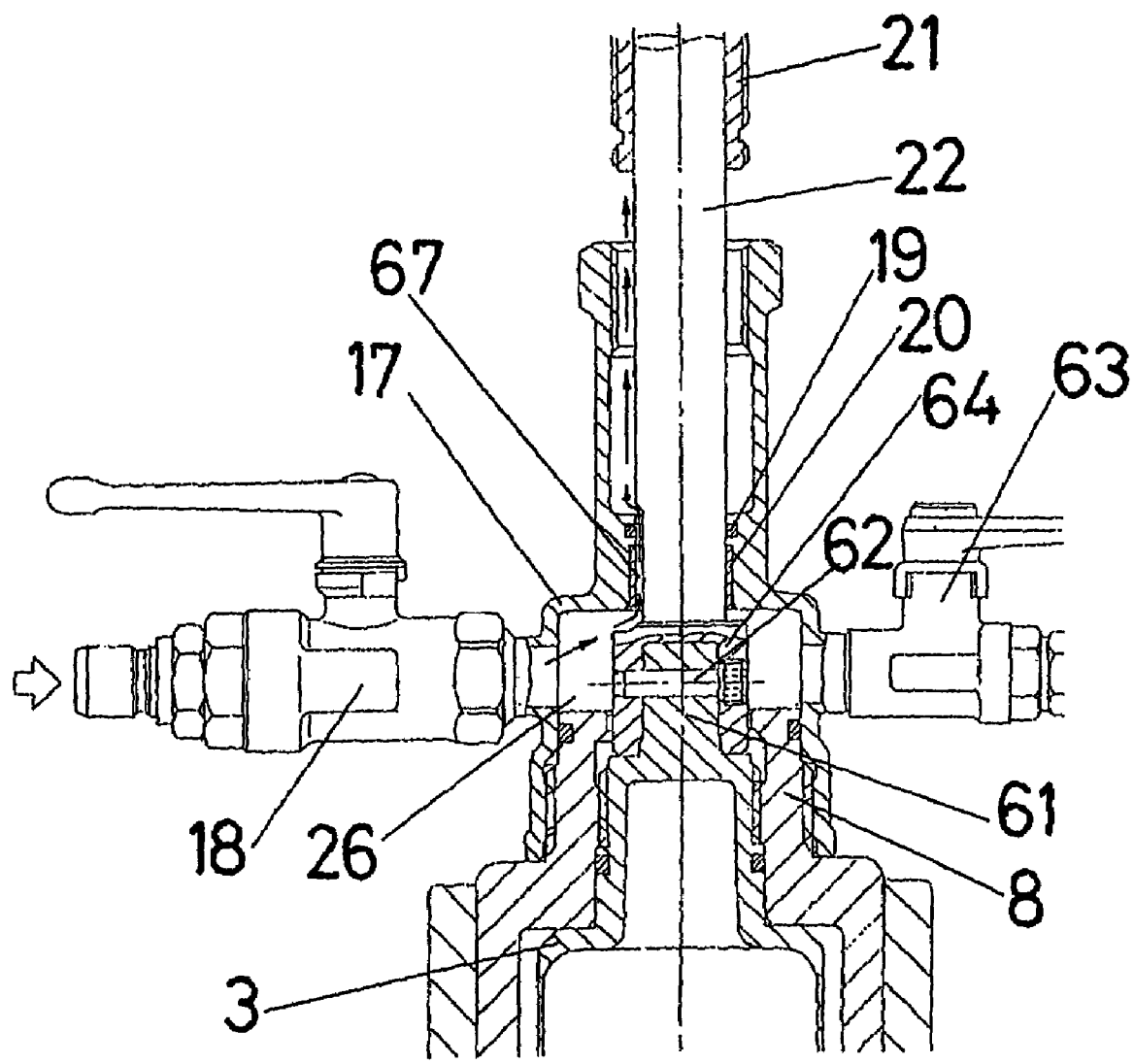
FIG. 17 shows a view of the device in the case of a false pressure test coupled to the neck of the bypass and the fluid exhaust conduit connected to the outside and which enables detecting this situation.
Figure 19:
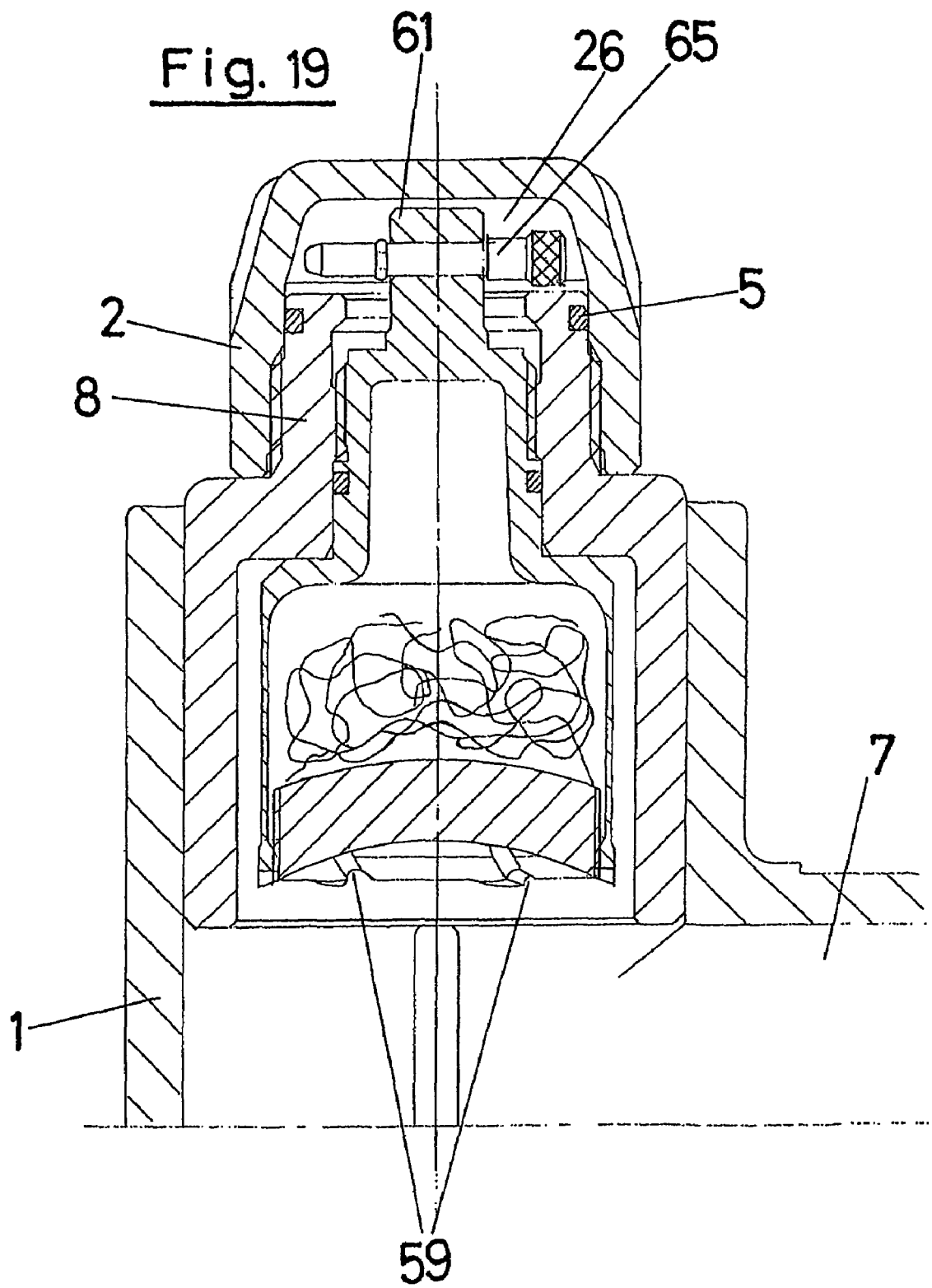
FIG. 19 shows a detailed cut-away view of a cutter alternative depicted in the previous figure held to the neck of the bypass with an anti-release pin.
Figure 20:
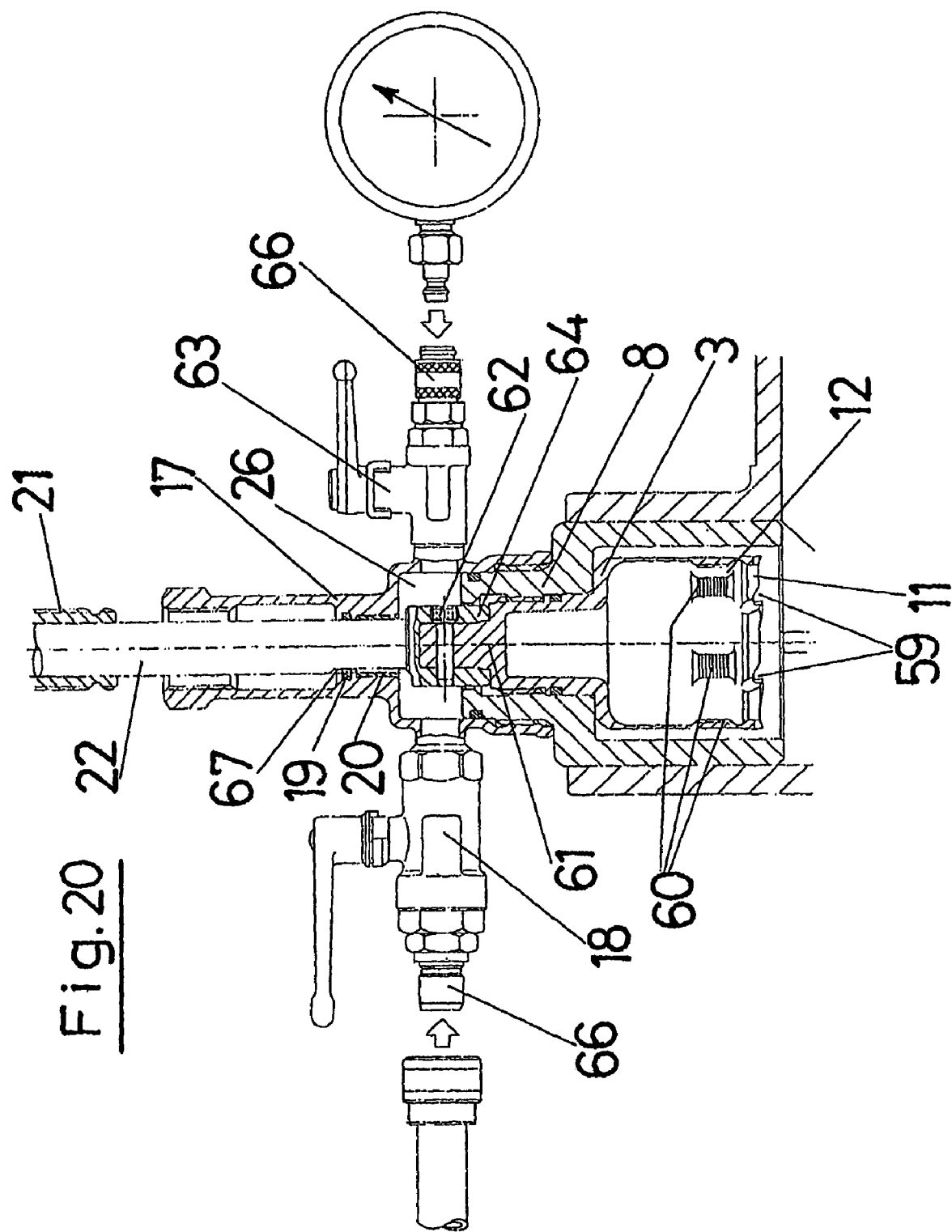
FIG. 20 shows a partially cut-away view of the perforation tool with two valves, there being a pressure gauge coupled in one of said valves and a conduit of a pressurization device, compressor, or the like, in the other valve.
Figure 21:
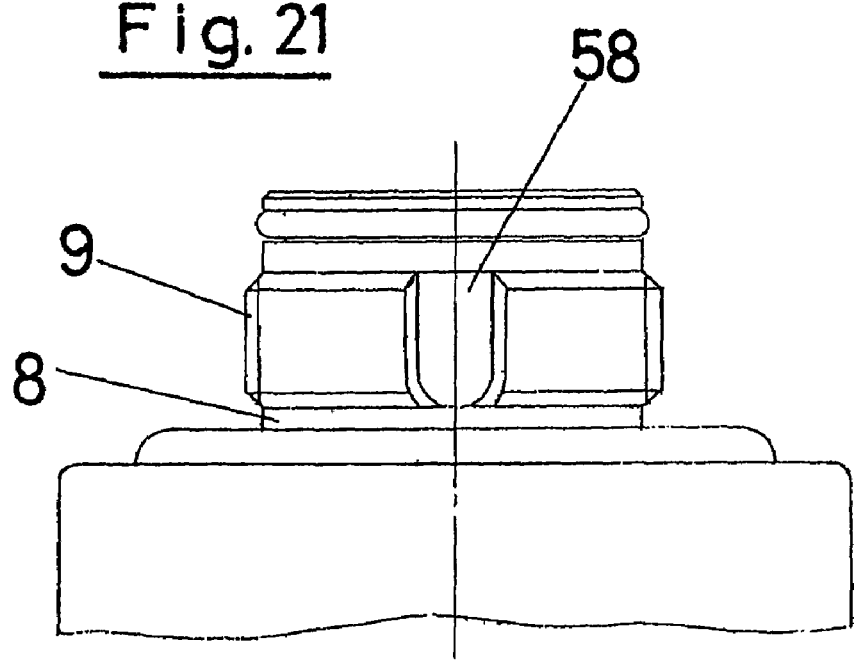
FIG. 21 shows an elevational view of the neck of the bypass with a depressurization groove in the thread for coupling the cover.
Figure 22:
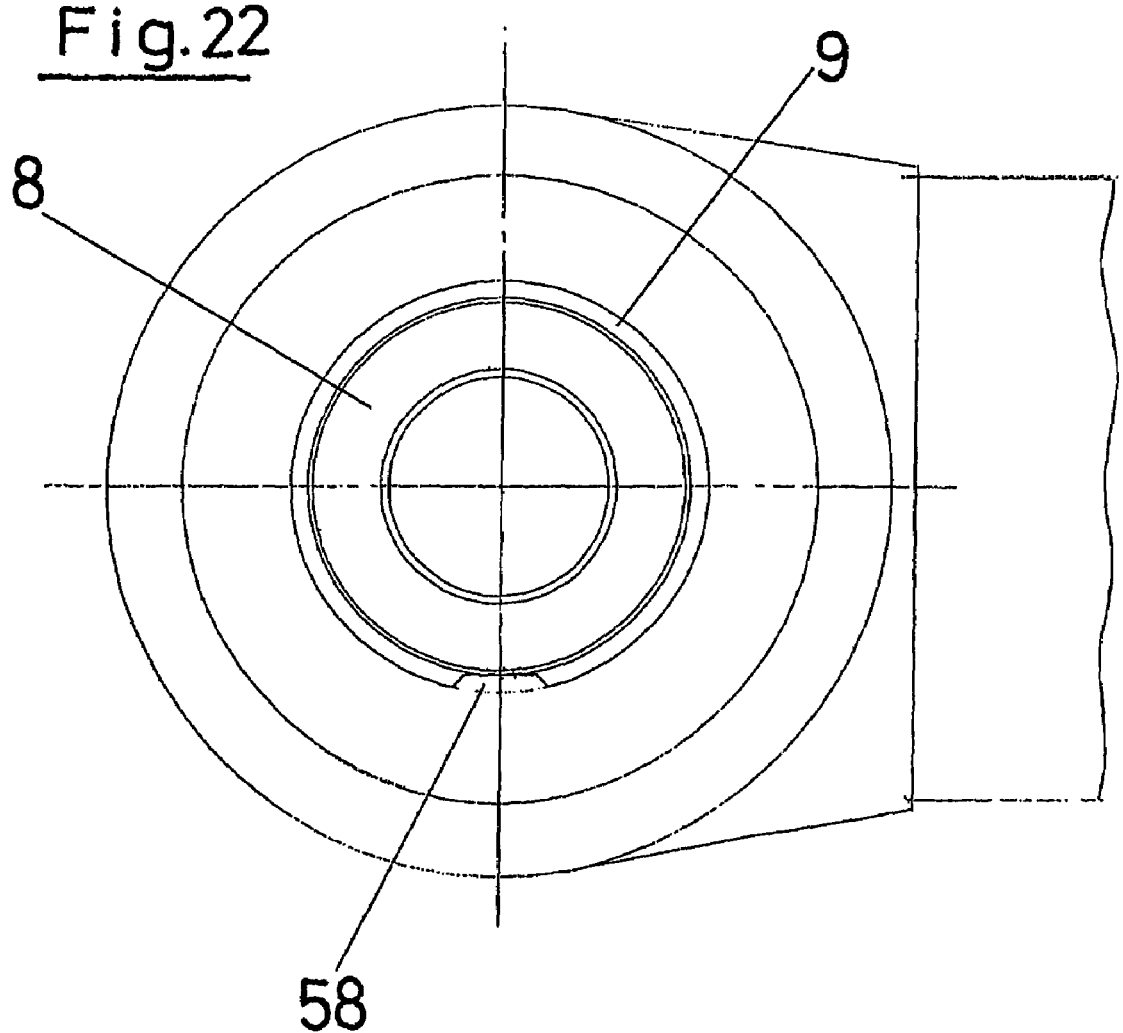
FIG. 22 shows a plan view of the neck of the bypass with a depressurization groove in the thread for coupling the cover.

In view of the indicated figures and according to the adopted numbering, a preferred although not limiting embodiment of the invention can be observed therein, which invention consists of a device comprising a T-shape body with a radial conduit (1), having a lower mouth (6) and a transverse conduit in its mid portion with a bypass mouth (7), the lower mouth (6) of the radial conduit (1) being coupled to a seat or collar joining it to the pipe (27) to be bypassed. The radial conduit (1) has a neck (8) at its upper end for attaching a cutter (3), said neck (8) having an internal threaded area (10) for fixing said cutter (3) and an external threaded area (9) for the coupling of a cover (2) or of a perforation tool. In an embodiment alternative, this threaded area (9) is affected with a longitudinal connection groove (58).

The cutter (3) comprises a body in the shape of an inverted cup with a toothed crown (11) at its lower mouth, said teeth (11) being overdimensioned with regard to the cylindrical outline (13) of the cutter (3). Said teeth (11) in turn have screw threads (12) on their inner side for retaining the cut disc (52) and the shavings (29) produced during the perforation of the pipe (27).

In a first embodiment, the upper portion of the cutter (3) is provided with a stepped extension, having a lower cylindrical body with a threaded area (33) corresponding with the thread (10) existing in the inner outline of the neck (8) and a gasket (4). Said extension has a second threaded area (32) at its end portion of a smaller diameter, and there existing a hole (51) at its upper base for receiving a prismatic male connector (15) or the like of the shaft (22).

In a second embodiment, the cutter (3) is provided at its upper portion with a stepped extension, having a lower cylindrical body with a threaded area (33) coinciding with the thread (10) existing in the inner outline of the neck (8) and a gasket (4). Said extension has a cylindrical or tapered male connector (61) of a smaller diameter at its end portion, and there being a transverse housing of a pin (62).

In one alternative, the cutter (3) has a space (59) between teeth (11) or a cavity for the passage of the small-sized shaving. In turn, said teeth (11) have screw threads (12) on their inner side for retaining the sectioned disc (52) and the shavings (29) produced during the perforation of the pipe (27).

In another embodiment alternative, there exist overdimensioned threaded projections (60) in the inner outline of the cup of the cutter (3) with threads (12) interrupted by hollowed-out spaces without screw threads.

The upper portion of the surrounding outline of the body of the cutter (3) can have a flared tapering (30) of an increasing nature, its diameter being greater than the outer outline (13) of the cutter and the diameter of the toothed crown (11).

Coupled on the outer outline of the neck (8) there exists a cover (2) with the threaded inner outline corresponding to the thread (9) of the neck and a gasket (5).

A perforation tool can be coupled on said neck (8), said tool constituted of a tubular body (17) having a threaded mouth (53) at its lower portion which can be coupled to the previously mentioned neck (8), in its threaded area (9), when the cover (2) is not coupled. This body (17) has an inner chamber (26) connecting with the radial conduit (1) through the hole of the neck (8) and in turn at least one valve (18 and/or 63) connecting with the outside. A threaded screw (21) is located at the upper portion of the body (17). This screw (21) houses therein a longitudinal shaft (22), preferably cylindrical, having a male connector (15) at its lower end which can be coupled to the upper hole (51) of the cutter (3), and a threaded nut (16) or bushing which can be coupled to the threaded outline (32) of the cutter (3). The shaft (22) has a retention washer (23) in a position behind said nut (16). The screw (21) has a threading (14) in its outline for introducing in the body (17) of the tool, of a length L which is greater than the advancing shifting needed by the cutter (3) when perforating the pipe (27), there being in this thread (14) a circular groove (14-a) next to its lower end for warning that it is the end of the thread. Said thread (14) of the screw (21) has the same pitch as the screw threads (12) of the teeth (11).

To couple the shaft (22) to a cutter provided with a coupling male connector (61), it has a mouth (64) at its lower end conjugated with said male connector (61) of the cutter (3) and with the corresponding holes (62) for introducing the securing means by screwing or the like.

The body (17) of the perforation tool has a gasket (19) and a bearing (20) rotating around the shaft (22) between the inner chamber (26) and the upper screw (21). The shaft (22) has a groove (67) of the shank in a position behind the lower end and operatively coinciding with the gasket (19) and with the bearing (20) when the shaft (22) is coupled to the cutter (3) arranged in the upper neck (8).

The screw (21) has a pin (24) at its upper portion which interlocks with the shaft (22) in collaboration with transverse holes (28) existing on said shaft (22). Said pin (24) has an elastic anti-extraction ring (25) at one end for the screw (21). Said shaft (22) has a prismatic head or the like at its upper end for being gripped by a rotating wrench.

The cutter (3) coupled to the neck (8) in an idle position can be retained by an anti-release nut (31) joined with the threaded outline (32) and supported on the upper edge of said neck (8) under the cover (2).

In one alternative, the cutter (3) coupled to the neck (8) in an idle condition can be secured by an anti-release pin (65) with an elastic retention ring, clip or the like housed in the transverse hole of the male connector (61) of the cutter (3), under the cover (2).

In one closure alternative, there is a cover (55) fitted on the neck (8) having a cylindrical sleeve (54) around its outline covering it, and is extended on the radial conduit (1), suitable for their joining by heat fusion, gluing, welding or another more or less permanent joining means.

In an embodiment alternative, the perforation tool comprises a U-shaped safety arch (36) on the upper portion of its body (17), extended a length that is equal to or greater than the length of the shaft (22) in its maximum extension outside of said body (17) of the tool. Said arch (56) has its two arms arranged on both sides of the shaft (22).

In an embodiment alternative of the cutter (13), it comprises a series of windows (57) or through openings in the outline (13) connecting the inside of the cup of the cutter (3) with the outside.

In an embodiment alternative, the valves (18 and 63) have standard quick connectors (66).

In an embodiment alternative, the body of the T-shaped bypass is constituted of a conventional T-shape (34) with male ends having a neck (36) connected with the cutter (3) and the cover (2) at its open end (35) of the radial conduit by means of welding or gluing.

In another alternative embodiment, the body of the T-shaped bypass is constituted of a T-shape with female ends (37) and a male bypass conduit (38) to which the neck (39) and the seat (40) or base which can be coupled to the pipe are joined by welding or gluing.

In another alternative embodiment, the body of the T-shaped bypass is constituted of a T-shape (41) manufactured in one piece for the application, from the beginning, incorporating the neck (42).

In another alternative embodiment, the body of the T-shaped bypass is constituted of a T-shape (43) manufactured in one piece for the application, from the beginning, incorporating the neck (42) and the base (45) for coupling to the pipe (27) to be bypassed.

In another alternative embodiment, the body of the T-shaped bypass is joined by means of its male end (47) to the female mouth (46) existing in the seating collar on the pipe (27) to be bypassed.

In another alternative embodiment, the body of the T-shaped bypass is joined by means of its male end (49) to a sleeve (50), which is in turn joined to the male mouth (48) existing in the seating collar on the pipe (27) to be bypassed.

The ivention claimed is:

1. A device for producing bypasses under pressure in fluid piping systems, of the type comprising a horizontal T-shaped body with a central radial conduit (1) which can be coupled at a lower mouth (6) of the conduit to a seat or collar for joining with a pipe (27) to be bypassed, and a side conduit with a mouth (7) for extracting the fluid from the bypass, the radial conduit (1) having a detachable access cover (2) at an upper portion thereof, the device comprising a perforation cutter (3), in the form of an inverted cup having teeth forming a toothed crown and, at a portion opposite to the toothed crown (11), a coaxial cylindrical extension with a stepping in two consecutive threaded areas (32 and 33) of a decreasing diameter, one threaded area (33) being constructed and arranged for coupling of the cutter with a threaded area (10) existing in an upper portion of the radial conduit; said extension of the cutter (3) comprising a hole (51) at an upper base thereof connected to a feed tool, co-aided by the threaded area (32); the device further comprising a tool for handling and feeding of the cutter (3), comprising a body (17) which can be coupled to the upper portion of the radial conduit (1) with a shaft (22) which can be detached through a screw (21) operatively suitable for extraction of the cutter (33) from the threaded area of the seat in the upper portion and for the perforation of the pipe (27) to be bypassed.

2. A device for producing bypasses under pressure in fluid piping systems according to claim 1, wherein the teeth (11) form a boring diameter of greater dimensions than a cylindrical outline (13) of the cutter (3).

3. A device for producing bypasses under pressure in fluid piping systems according to claim 1, further comprising at the upper portion of the radial conduit (1) a neck (8) or coupling with an inner threaded area (10) for coupling of the cutter (3) and an outer threaded area (9) for coupling of a cover (2) or a perforation tool.

4. A device for producing bypasses under pressure in fluid piping systems according to claim 3, wherein the outer threaded area (9) of the neck (8) has a gasket (5) with a cover (2) or with the perforation tool at the base.

5. A device for producing bypasses under pressure in fluid piping systems according to claim 4, wherein the perforation tool comprises a tubular body (17) which can be coupled to the outer thread (9) of the neck (8) by means of a mouth (53) and which has a longitudinally movable shaft (22) connected to a threaded screw (21), one end of this shaft (22) being connected in a detachable manner to the upper portion of the cutter (3) and the other end suitable for the coupling of a tool or rotating wrench.

6. A device for producing bypasses under pressure in fluid piping systems according to claim 5, wherein the shaft (22) comprises a male connector (15) with a nut (16) for coupling to the upper end of the cutter (3), said male connector (15) comprises a shape according to the hole (51) or cavity existing in the upper portion of the cutter (3), the nut (16) is suitable for its coupling with the threaded area (32) for fixing thereof and the shaft (22) comprises a retention washer (23) for retaining said nut (16) preventing an incorrect assembly of the shaft with the cutter.

7. A device for producing bypasses under pressure in fluid piping systems according to claim 5, wherein the body (17) has an inner chamber (26) after the mouth (53) connecting with the conduit (1) through the hole of the neck (8) and the body has a valve (18) connecting said inner chamber (26) with the outside.

8. A device for producing bypasses under pressure in fluid piping systems according to claim 6, further comprising a threaded screw (21) at the upper portion of the body (17), with a hollow core in which the longitudinally sliding shaft (22) is located, said screw (21) comprises a thread (14) of a length L greater than the advancing shifting needed by the cutter (3) when perforating the pipe (27), a pin (24) housed in the upper portion of the screw (21) which can be positioned in a series of transverse holes (28) of the shaft (22) for joining by interlinking, the pin (24) having a retention ring (25) at one end.

9. A device for producing bypasses under pressure in fluid piping systems according to claim 7, wherein the body (17) has a bearing (20) and a gasket (19) around the shaft (22), both arranged between the inner chamber (26) and the upper screw (21).

10. A device for producing bypasses under pressure in fluid piping systems according to claim 8, wherein the screw (21) comprises a circular groove (14-*a*) close to the lower end of the thread (14) to warn of the end of the thread.

11. A device for producing bypasses under pressure in fluid piping systems according to claim 8, wherein the teeth (11) have screw threads (12) on an inner outline which are suitable for firmly holding the perforated disc (52) and shavings (29), and said screw threads (12) are of the same pitch as the threaded area (14) of the screw (21).

12. A device for producing bypasses under pressure in fluid piping systems according to claim 2, wherein the cutter (3) has a flared tapering (30) of an increasing nature and a larger diameter than the outer outline (13) of the cutter and the diameter of said toothed crown (11) operatively suitable for plugging the opening made in pipe (27) and carrying out the function of interrupting the fluid.

13. A device for producing bypasses under pressure in fluid piping systems according to claim 1, wherein a first of the two threaded areas (32) has a notably different pitch than a second of the two threaded areas (33).

14. A device for producing bypasses under pressure in fluid piping systems according to claim 3, wherein the threaded area (33) of the cutter has a groove next to the base thereof in which there is disposed a gasket (4) compressible with the neck (8) when said cutter (3) is in idle position coupled thereto.

15. A device for producing bypasses under pressure in fluid piping systems according to claim 3, further comprising an anti-release nut (31) which can be coupled to the threaded area (32) of the cutter and supported on the mouth of the neck (8) of the conduit (1), which can be covered with the cover (2).

16. A device for producing bypasses under pressure in fluid piping systems according to claim 3, further comprising a cover (55) fitted on the neck (8), with a cylindrical sleeve (54) encircling the cover, said sleeve being extended on the radial conduit (1), suitable for their joining by heat fusion, gluing, welding or other permanent or semi-permanent means.

17. A device for producing bypasses under pressure in fluid piping systems according to claim 5, further comprising a protective arch (56) on the body (17) of the tool, projecting from the shaft (22) outside of said body (17), the arch (56) having a U shape and a length equal to or greater than the length of the shaft (22) in maximum extension of the body (17); the arch (56) being arranged on either side of the trajectory of said shaft (22).

18. A device for producing bypasses under pressure in fluid piping systems according to claim 1, further comprising a series of windows (57) or through holes in the body of the cutter (1) or cutting tool, operatively suitable for connecting said pipe and the space behind the radial conduit (1) and the bypass in general during the perforation of the inside of the pipe (27); said windows (57) being arranged in the surrounding outline (13) of the cutter (3).

19. A device for producing bypasses under pressure in fluid piping systems according to claim 5, further comprising a cylindrical or tapered male connector (61) on said extension (33) of the cutter (3) at its upper portion connected to a mouth (64) of the shaft (22) of the perforation tool connected by means of a pin (62) or clip.

20. A device for producing bypasses under pressure in fluid piping systems according to claim 5, wherein the body (17) of the perforation tool has two valves (18 and 62) for coupling the pressurization mechanism and testing the bypass and a gas gauge for verification in an independent manner.

21. A device for producing bypasses under pressure in fluid piping systems according to claim 19, wherein the pin (62) connected to the male connector (61) and the mouth (64) of the shaft (22) comprises a thread or locking means.

22. A device for producing bypasses under pressure in fluid piping systems according to claim 5, wherein the shaft (22) comprises in a shank a groove (67) or connection close to the mouth (64), between the chamber (26) and the outside, bridging the gasket (19) and the bearing (20) through the cavity of the screw (21) when said shaft (22) is coupled to the cutter (3) arranged on the neck (8) operatively suitable for preventing a false measurement of bypass leak-tightness due to plugging of said cutter (3) warning of pressurization fluid through said groove (67) and the cavity of the screw (21).

23. A device for producing bypasses under pressure in fluid piping systems according to claim 1, wherein the cutter (3) comprises overdimensioned threaded projections (60) at an inner outline and behind the teeth (11), with the screw threads (12) being interrupted by spaces without screw threads.

24. A device for producing bypasses under pressure in fluid piping systems according to claim 1, wherein the teeth (11) in the outline of the cutter (3) are separated by small spaces (59).

25. A device for producing bypasses under pressure in fluid piping systems according to claim 3, wherein the thread (9) of the neck (8) has a longitudinal groove (58) operatively suitable for preventing pressurization of the chamber formed between the cover (2) and the neck (8) due to a residual leak.

26. A device for producing bypasses under pressure in fluid piping systems according to claim 19, further comprising a locking and anti-release pin (65) with an elastic retention ring or clip, housed in the transverse hole of the male connector (61) of the cutter (3), under the cover (2).

27. A device for producing bypasses under pressure in fluid piping systems according to claim 19, further comprising a retention clip or catch housed in the transverse hole of the male connector (61) of the cutter (3), under the cover (2).

28. A device for producing bypasses under pressure in fluid piping systems according to claim 1, wherein the T-shaped body comprises T-shape (34) with male ends having a neck (36) connected with the cutter (3) and the cover (2) at the open end (35) of the radial conduit by means of welding or gluing.

29. A device for producing bypasses under pressure in fluid piping systems according to claim 1, wherein the T-shaped body comprises a T-shape with female ends (37) and a male bypass conduit (38), to which the neck (39) and the seat (40) or base which can be coupled to the pipe are joined by welding or gluing.

30. A device for producing bypasses under pressure in fluid piping systems according to claim 1, wherein the T-shaped body comprises a T-shape (41) manufactured in one piece which incorporates the neck (42).

31. A device for producing bypasses under pressure in fluid piping systems according to claim 1, wherein the T-shaped body comprises a T-shape (43) manufactured in one piece which incorporates the neck (44) and the base (45), to couple to the pipe (27) to be bypassed.

32. A device for producing bypasses under pressure in fluid piping systems according to claim 1, wherein a lower male mouth (47) of the T-shaped body is welded or glued to a collar with a female mouth (48).

33. A device for producing bypasses under pressure in fluid piping systems according to claim 1, wherein a lower male mouth (47) of the T-shaped body is connected to the collar (48) by means of welding or gluing or by means of an intermediate sleeve (50).

* * * * *